(12) United States Patent
Fujita et al.

(10) Patent No.: US 10,682,808 B2
(45) Date of Patent: Jun. 16, 2020

(54) THREE-DIMENSIONAL OBJECT FABRICATION METHOD, FABRICATION APPARATUS, AND FABRICATION SYSTEM

(71) Applicants: Takashi Fujita, Kanagawa (JP); Akira Saito, Kanagawa (JP); Kiichi Kamoda, Kanagawa (JP); Yasutada Shitara, Kanagawa (JP); Kazuhiko Watanabe, Tokyo (JP); Hitoshi Iwatsuki, Kanagawa (JP); Yuuya Endoh, Kanagawa (JP); Kazufumi Kimura, Kanagawa (JP); Yasuyuki Yamashita, Kanagawa (JP); Shinnosuke Koshizuka, Kanagawa (JP); Yuuki Kamon, Kanagawa (JP); Nozomu Tamoto, Shizuoka (JP)

(72) Inventors: Takashi Fujita, Kanagawa (JP); Akira Saito, Kanagawa (JP); Kiichi Kamoda, Kanagawa (JP); Yasutada Shitara, Kanagawa (JP); Kazuhiko Watanabe, Tokyo (JP); Hitoshi Iwatsuki, Kanagawa (JP); Yuuya Endoh, Kanagawa (JP); Kazufumi Kimura, Kanagawa (JP); Yasuyuki Yamashita, Kanagawa (JP); Shinnosuke Koshizuka, Kanagawa (JP); Yuuki Kamon, Kanagawa (JP); Nozomu Tamoto, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 39 days.

(21) Appl. No.: 16/056,855

(22) Filed: Aug. 7, 2018

(65) Prior Publication Data

US 2019/0126538 A1    May 2, 2019

(30) Foreign Application Priority Data

Oct. 27, 2017   (JP) .................................. 2017-208523

(51) Int. Cl.
*B29C 64/147*   (2017.01)
*B29C 64/218*   (2017.01)
*B29C 64/40*    (2017.01)

(52) U.S. Cl.
CPC .......... *B29C 64/147* (2017.08); *B29C 64/218* (2017.08); *B29C 64/40* (2017.08)

(58) Field of Classification Search
USPC ................ 156/249, 277, 289, 537, 538, 540
See application file for complete search history.

(56) References Cited

U.S. PATENT DOCUMENTS 5,833,914 A * 11/1998 Kawaguchi ............. B29C 67/06
264/400
6,200,514 B1  3/2001 Meister
(Continued)

FOREIGN PATENT DOCUMENTS

CN       204820476 U    12/2015
EP       2563568 A2     3/2013
(Continued)

OTHER PUBLICATIONS

Extended European Search Report dated Apr. 1, 2019.
U.S. Appl. No. 15/917,993, filed Mar. 12, 2018, Nozomu Tamoto, et al.
U.S. Appl. No. 15/919,251, filed Mar. 13, 2018, Sohichiroh Iida, et al.
(Continued)

*Primary Examiner* — Sing P Chan
(74) *Attorney, Agent, or Firm* — Harness, Dickey & Pierce, P.L.C.

(57) ABSTRACT

A fabrication method includes laminating a fabrication material to form an object, and applying a release material on a surface of the object to form a release layer on the surface of the object. A surface free energy of the release material is equal to or smaller than 25 mN/m.

20 Claims, 15 Drawing Sheets

(56) References Cited

U.S. PATENT DOCUMENTS

| | | |
|---|---|---|
| 2004/0037595 A1 | 2/2004 | Takashi et al. |
| 2016/0038633 A1 | 2/2016 | Watanabe |
| 2016/0040025 A1 | 2/2016 | Norikane et al. |
| 2016/0160021 A1 | 6/2016 | Kojima et al. |
| 2016/0177122 A1 | 6/2016 | Naruse et al. |
| 2016/0236412 A1 | 8/2016 | Kusahara et al. |
| 2016/0271877 A1 | 9/2016 | Suzuki et al. |
| 2016/0271879 A1 | 9/2016 | Yamashita et al. |
| 2017/0151721 A1 | 6/2017 | Stephenson et al. |
| 2017/0173868 A1 | 6/2017 | Mark |
| 2017/0197365 A1 | 7/2017 | Sugiyama et al. |
| 2017/0209927 A1 | 7/2017 | Yamashita et al. |
| 2017/0217087 A1 | 8/2017 | Tamoto et al. |
| 2017/0217090 A1 | 8/2017 | Endoh et al. |
| 2017/0225404 A1 | 8/2017 | Naruse et al. |
| 2017/0232673 A1* | 8/2017 | Usami .................. B33Y 10/00 156/64 |
| 2018/0001520 A1 | 1/2018 | Saito et al. |
| 2018/0022024 A1 | 1/2018 | Saito et al. |
| 2018/0023219 A1 | 1/2018 | Saito et al. |
| 2018/0147780 A1 | 5/2018 | Kamoda et al. |

FOREIGN PATENT DOCUMENTS

| | | |
|---|---|---|
| EP | 2910324 A2 | 8/2015 |
| JP | 7-186277 | 7/1995 |
| JP | 11-221829 | 8/1999 |
| JP | 2003-053846 | 2/2003 |
| JP | 2007-051244 A | 3/2007 |
| JP | 2007-256809 | 10/2007 |
| JP | 2015-139918 A | 8/2015 |
| JP | 2015-180538 | 10/2015 |
| JP | 2016-040121 | 3/2016 |
| JP | 2016-064649 A | 4/2016 |
| WO | WO-2011/135496 A2 | 11/2011 |
| WO | WO-2017/038985 A1 | 3/2017 |

OTHER PUBLICATIONS

U.S. Appl. No. 16/007,064, filed Jun. 13, 2018, Akira Saito, et al.
U.S. Appl. No. 15/991,595, filed Nov. 29, 2016, Akira Saito, et al.
European Office Action dated Jul. 5, 2019.
European Office Action dated Nov. 6, 2019.

\* cited by examiner

| FABRICATION MATERIAL | SPECIFIC GRAVITY | RELEASE MATERIAL | | DENATURED PTFE | PFA | FEP | PCTFE | PMP |
|---|---|---|---|---|---|---|---|---|
| | | Tm1 | SPECIFIC GRAVITY | 2.17 | 2.15 | 2.15 | 2.13 | 0.83 |
| PC | 1.20 | 150°C | | 165°C | | | | |
| PA12 | 1.01 | 176°C | | 225°C | | | | |
| POM | 1.42 | 181°C | | 225°C | | | | 230°C |
| PSF | 1.24 | 200°C | | 225°C | | | 220°C | |
| PEI | 1.27 | 216°C | | | | 260°C | | |
| PA6 | 1.14 | 225°C | | | | 260°C | | |
| PBT | 1.31 | 232–267°C | | | 310°C | | | |
| PA66 | 1.13 | 265°C | | | 310°C | | | |
| PPS | 1.34 | 290°C | | | | | | |

Tm2

FIG. 20
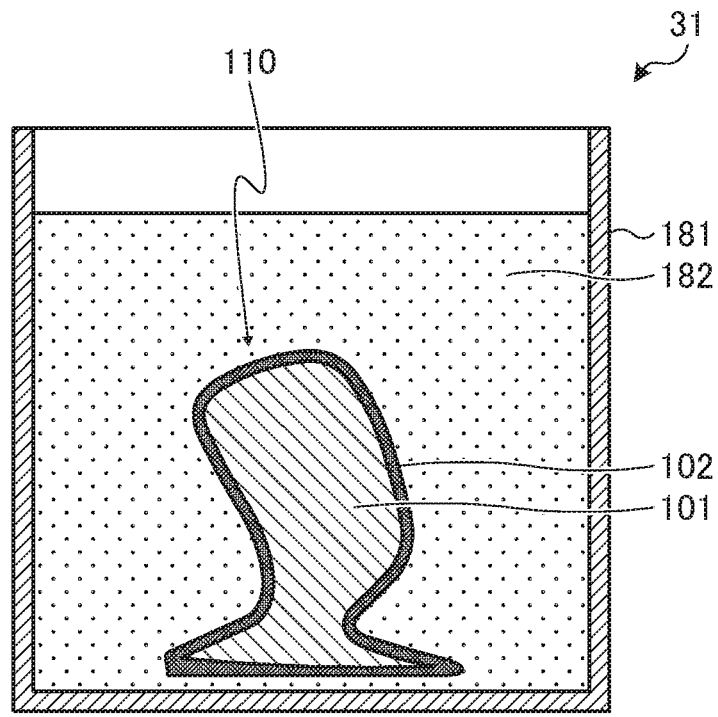
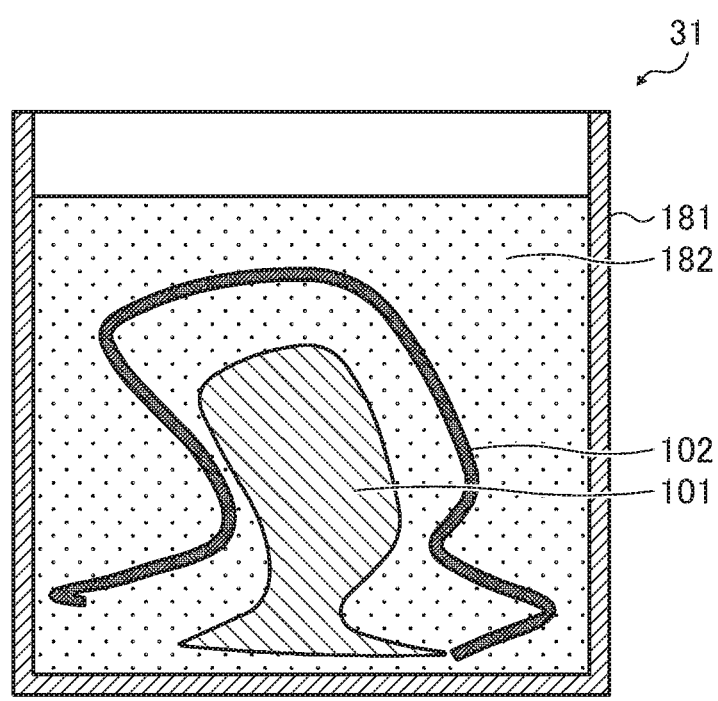

FIG. 21
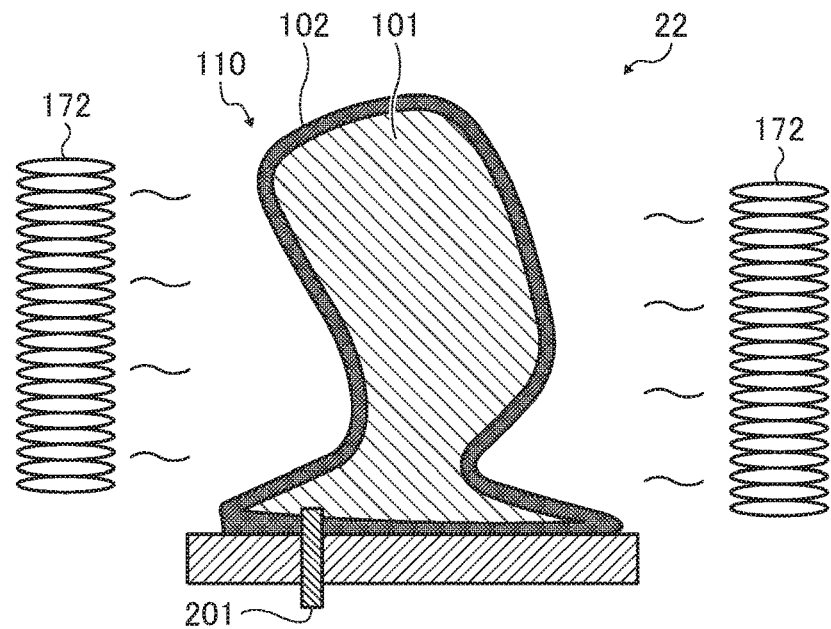
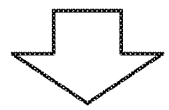
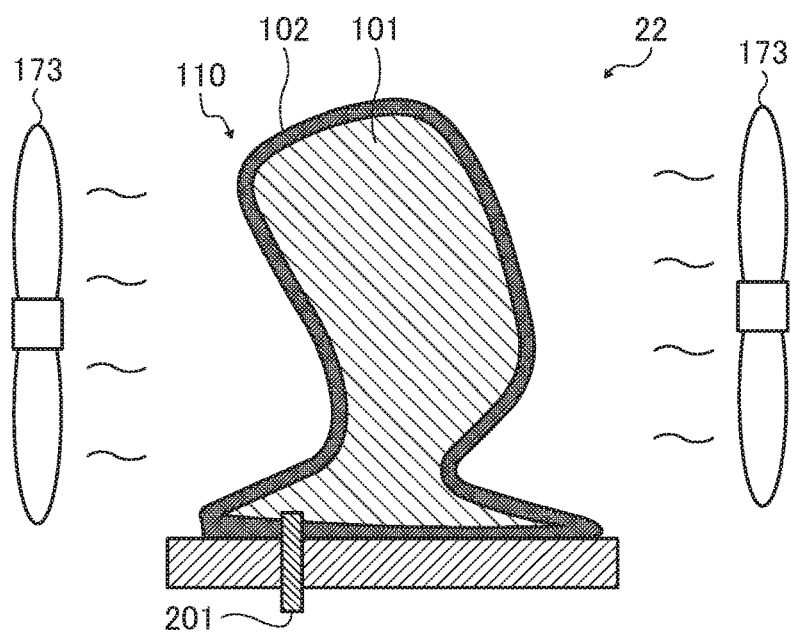

THREE-DIMENSIONAL OBJECT FABRICATION METHOD, FABRICATION APPARATUS, AND FABRICATION SYSTEM

CROSS-REFERENCE TO RELATED APPLICATION

This patent application is based on and claims priority pursuant to 35 U.S.C. § 119(a) to Japanese Patent Application No. 2017-208523, filed on Oct. 27, 2017, in the Japan Patent Office, the entire disclosure of which is hereby incorporated by reference herein.

BACKGROUND

Technical Field

Aspects of the present disclosure relate to a fabrication method for fabricating a three-dimensional object, a fabrication apparatus, and a fabrication system.

Related Art

A layer fabrication method is used as a method for fabricating a three-dimensional object (hereinafter, simply referred to as "object"). The layer fabrication method generates a plurality of sectional shape data from three-dimensional shape data of the object and laminates a plurality of the layers generated based on the sectional shape data.

Layer fabrication methods are classified into multiple types according to the method of forming a layer, the layer lamination method, and the like. For example, layer fabrication methods using electrophotography, fused deposition modeling (FDM), stereolithography, selective laser sintering, material jetting, binder jetting, sheet lamination, directional energy deposition, and the like are known in the art.

To fabricate a three-dimensional object using the layer fabrication method, it may be necessary to form a supporting structure other than the object that is a target to be fabricated. The supporting structure is required to support a lower part of the object at the time of a lamination process or to fabricate an object having a void, or the like. Ultimately, the supporting structure has to be separated from the object.

A method is known that uses particles constituting the supporting structure for easily removing the supporting structure from the object by solvent containing water. Each of the particles includes a core and a shell that coats a surface of the core. The particles are water soluble, and the shell has a solubility smaller than a solubility of the core.

SUMMARY

In an aspect of this disclosure, a novel fabrication method includes laminating a fabrication material to form an object, and applying a release material onto a surface of the object to form a release layer on the surface of the object. A surface free energy of the release material is equal to or smaller than 25 mN/m.

In another aspect of this disclosure, a fabrication apparatus and system for manufacturing an object includes a first image forming unit to laminate a layer of a fabrication material, and a second image forming unit to form a layer of a release material on a surface of the layer of the fabrication material. A surface free energy of the release material is equal to or smaller than 25 mN/m.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 20 is a cross-sectional view of the peeling process executed by the peeling unit according to the second embodiment; and FIG. 21 is a cross-sectional view of an example of execution of the heating and cooling process executed by the heating and cooling unit according to a third embodiment.

Figure 1:
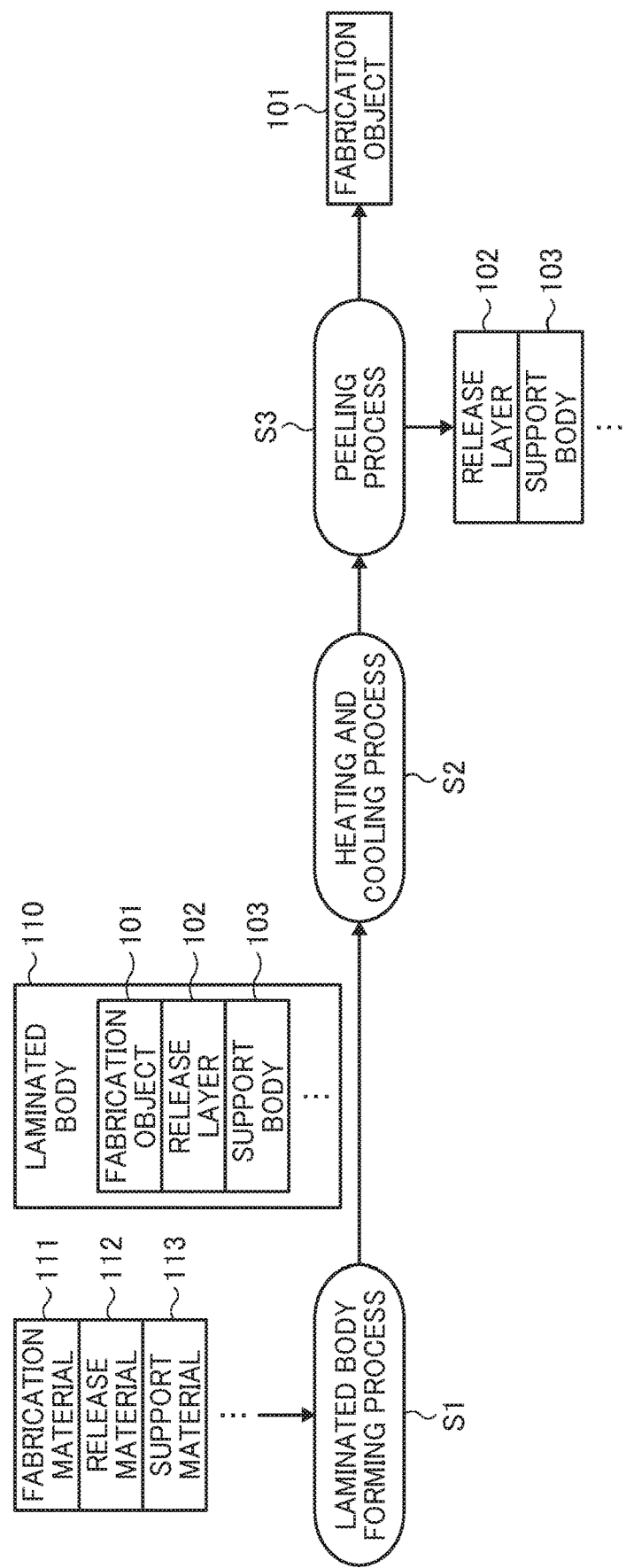
FIG. 1 is a flowchart illustrating an example of a fabrication method according to a first embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in an analogous manner, and achieve equivalent results.

Although the embodiments are described with technical limitations with reference to the attached drawings, such description is not intended to limit the scope of the disclosure and all the components or elements described in the embodiments of this disclosure are not necessarily indispensable. As used herein, the singular forms "a", "an", and "the" are intended to include the plural forms as well, unless the context clearly indicates otherwise.

Hereinafter, referring to the drawings, embodiments of the present disclosure are described in detail. The embodiments described below are just preferred embodiments and the present disclosure is not limited thereto. Various modifications can be made without departing from the scope of the present disclosure. Numerous additional modifications to the following embodiment and variations are possible. It is therefore to be understood that, within the scope of the appended claims, the disclosure of this patent specification may be practiced otherwise than as specifically described herein.

First Embodiment

Method of Manufacturing Object

FIG. 1 is a flowchart illustrating an example of a fabrication method according to a first embodiment. The method for fabricating a three-dimensional object according to the present embodiment is a method for fabricating a three-dimensional object using a laminating fabrication method. The method for fabricating a three-dimensional object according to the present embodiment includes a laminated body forming process S1, a heating and cooling process S2, and a peeling process S3.

The laminated body forming process S1 includes a step of forming an object 101 (a three-dimensional object) by laminating the fabrication material 111 layer by layer and a step of applying a release layer 102 made of release material 112 onto a surface of the object 101. In the laminated body forming process S1 according to the present embodiment, a laminated body 110 including the object 101 covered with the release layer 102 is formed by laminating layers including the fabrication material 111 and the release material 112. The laminated body forming process S1 is an example of a process for forming the fabrication material 111 to which the release layer 102 is applied.

The fabrication material 111 may be appropriately selected according to the object 101 to be fabricated. Examples of the fabrication material 111 include PC (polycarbonate), PA12 (polyamide 12), PEI (polyether imide), PBT (polybutylene terephthalate), PSU (polysulfone), PA 66 (polyamide 66), PET (polyethylene terephthalate), LCP (liquid crystal polymer), PEEK (polyether ether ketone), POM (polyacetal), PSF (polysulfone), PA6 (polyamide 6), PPS (polyphenylene sulfide), or the like. Further, the fabrication material 111 is not limited to a crystalline resin, and may be an amorphous resin or a mixed crystalline and amorphous resin. When the amorphous resin or the mixed resin is used as the fabrication material 111, the temperature at which the fabrication material 111 is melted is set based on 1.5 times the glass transition point (absolute temperature) or the like since the amorphous resin or the mixed resin has no melting point.

The release layer 102 functions as a mold for stabilizing shape of the object 101. Further, the release layer 102 is interposed between the object 101 and unnecessary portions present around the object 101, and thus also functions as a layer for separating unnecessary portions from the object 101. Good releasability is required for the release layer 102. The release material 112 constituting the release layer 102 is, for example, PMP (polymethylpentene), FEP (tetrafluoroethylene-hexafluoropropylene copolymer), PFA (tetrafluoroethylene-perfluoroalkylvinylether copolymer), Modified PTFE (polytetrafluoroethylene), PVDF (polyvinylidene fluoride), PCTFE (polychlorotrifluoroethylene), and the like. Thus, the release material 112 contains at least one substance selected from a group of FEP, PFA, modified PTFE, and PVDF.

A support material 113 may be included in each layer constituting the laminated body 110 in addition to the fabrication material 111 and the release material 112. The support material 113 constitutes a supporting structure 103 formed in a portion (void) in which the object 101 is not present. The supporting structure 103 is formed to support a lower part of the object 101 at time of lamination of the object 101 or to form a void in the object 101. The supporting structure 103 is one of the unnecessary portions ultimately removed from the object 101. The laminated body 110 including the object 101, the release layer 102, and the supporting structure 103 is formed by laminating the layers that includes the fabrication material 111, the release material 112, and the support material 113. The laminated body 110 is an example of an object constituting the object 101 to which the release layer 102 is applied. The support material 113 may be appropriately selected according to the purpose of fabrication of the object 101. For example, as similar to the fabrication material 111, the support material 113 may be selected from PC, PA12, PEI, PBT, PSU, PA66, PET, LCP, PEEK, POM, PSF, PA6, PPS, or the like.

The heating and cooling process S2 is a process of heating the laminated body 110 at a temperature at which the fabrication material 111 melts to melt the fabrication material 111 and then cooling the laminated body 110 to solidify the fabrication material 111. As a result, the fabrication material 111 (object 101) is melted once inside the release layer 102 and then solidified. Thus, the shape of the object 101 can be stabilized. The release layer 102 functions as a mold for stabilizing the shape of the object 101. At this time, the laminated body 110 may be heated and cooled in a state in which a filler is used to fill in the outside of the release layer 102. The filler serves as a mold, a pressurizing agent, a heat transferring material, or the like. Further, the laminated body 110 may be pressurized via a filler. Thus, the shape of the object 101 can be further stabilized.

The peeling process S3 is a step for peeling the release layer 102 from the object 101. At this time, when the filler is filled in the outside of the release layer 102, the filler is also peeled off together with the release layer 102. Further, when the supporting structure 103 is included in the laminated body 110, the supporting structure 103 is also peeled off together with the release layer 102.

Fabrication System

Figure 2:
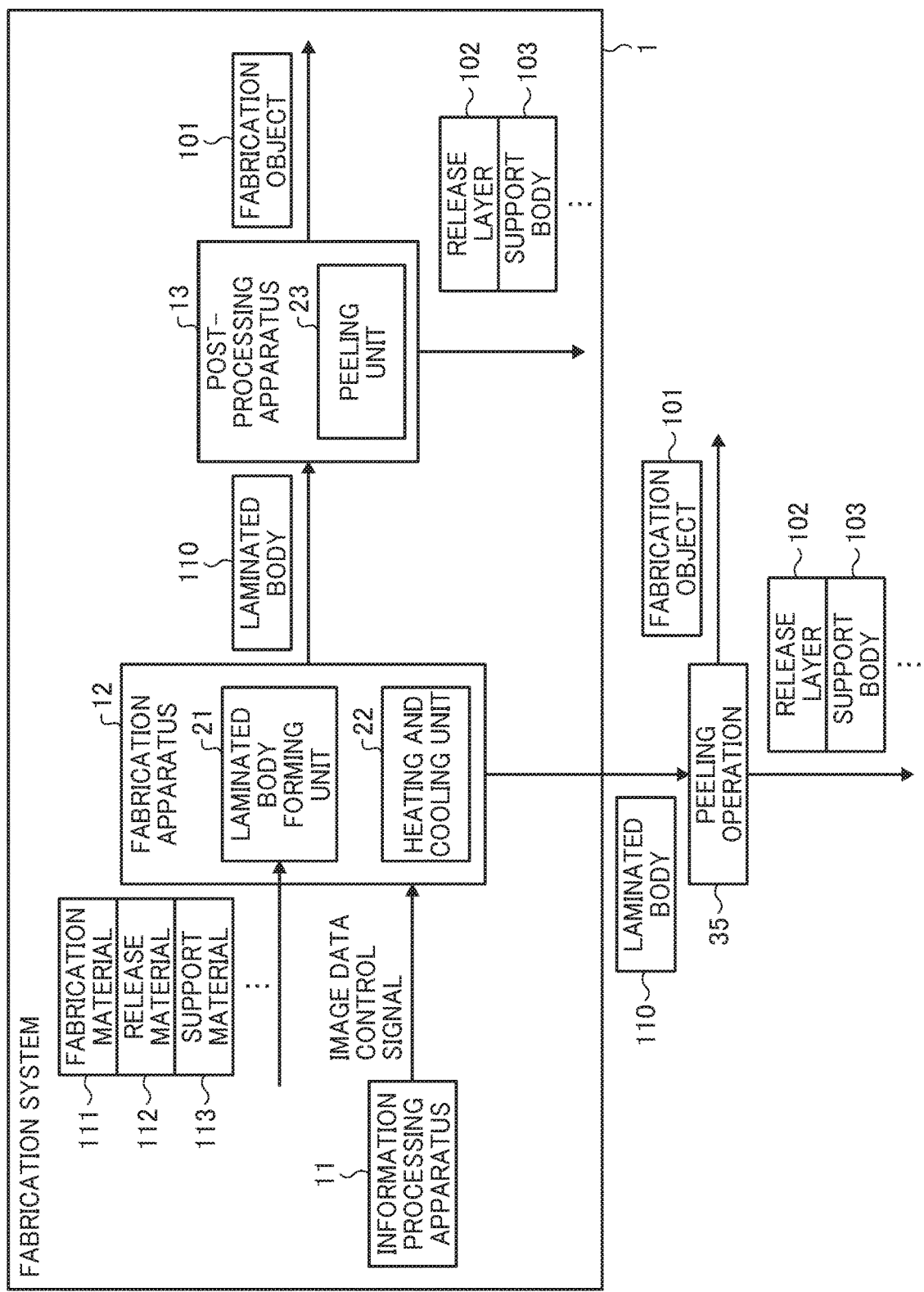
FIG. 2 is a block diagram illustrating an example of a configuration of the fabrication system according to the first embodiment.

FIG. 2 is a block diagram illustrating an example of a configuration of the fabrication system 1 according to the first embodiment. The fabrication system 1 according to the present embodiment is an example of a system for implementing the method for manufacturing the object as illustrated in FIG. 1. The fabrication system 1 according to the present embodiment includes an information processing apparatus 11, a fabrication apparatus 12, and a post-processing apparatus 13.

The information processing apparatus 11 controls the fabrication apparatus 12. The information processing apparatus 11 is, for example, a general-purpose computer (a personal computer, a smartphone, etc.) and is connected to the fabrication apparatus 12 via an appropriate computer network. In the information processing apparatus 11, an application, a driver, and the like for controlling the fabrication apparatus 12 are installed. The information processing apparatus 11 acquires, generates, and transmits the image data of the object 101 to be fabricated and a control signal (command) for controlling the fabrication apparatus 12, for example. The image data includes various information relating to the object 101. For example, the various information may include a three-dimensional shape, a cross-sectional shape, material, a color, a hardness, a number of manufacturing items, and the like.

The fabrication apparatus 12 forms the laminated body 110 including the object 101 to be fabricated according to the image data, control signals, and the like acquired from the information processing apparatus 11 via the computer network. The fabrication apparatus 12 corresponds to what is referred to as a 3D printer, a rapid prototyping apparatus, or the like. The fabrication apparatus 12 according to the present embodiment includes a laminated body forming unit 21 and a heating and cooling unit 22.

The laminated body forming unit 21 forms the laminated body 110 including the object 101, the release layer 102, the supporting structure 103, and the like by laminating the layers including materials such as the fabrication material 111, the release material 112, the support material 113, and the like. The specific structure of the laminated body forming unit 21 is not particularly limited. The structure of the laminated body forming unit 21 may be appropriately designed according to the laminating fabrication method to be adopted. The laminated body forming unit 21 includes a layer forming unit and a lamination unit, for example. The layer forming unit generates each layer according to sectional-shape data. The lamination unit sequentially laminates the generated layers. For example, the layer forming unit using an electrophotographic process includes the layer forming unit includes a photoreceptor (image carrier), a charging device for charging the photoreceptor, an exposure device to irradiate the charged photoreceptor with light to form a latent image on the charged photoreceptor, a developing device for adhering the above-described material to the latent image to form an image, a transfer device for transferring the formed image onto a carrier, and the like. A layer forming unit using FDM (Fused Deposition Modeling) method includes a fabrication head or the like for melting and discharging the above material.

A program for implementing the functions of the information processing apparatus 11 and the fabrication apparatus 12 may be stored in a computer readable recording medium such as a compact disc read only memory (CD-ROM), a flexible disk (FD), a compact disc recordable (CD-R), and a digital versatile disk (DVD), in an installable or executable file format. Furthermore, the program may be provided by storing the program in a computer connected to a network such as the Internet and downloaded to the information processing apparatus 11 or the fabrication apparatus 12 via the network. The program may be provided or distributed via the network. The program may be incorporated in the storage device of the information processing apparatus 11 or the fabrication apparatus 12 in advance to be provided. The program may be a module configuration for implementing at least one of a plurality of functions of the information processing apparatus 11 and the fabrication apparatus 12.

The heating and cooling unit 22 stabilizes a shape of the object 101 by heating and cooling the laminated body 110 formed by the laminated body forming unit 21. The specific configuration of the heating and cooling unit 22 is not particularly limited. For example, the heating and cooling unit 22 may include a heating unit configured as an electric heater or the like, a cooling unit configured as a blower or the like, a pressure unit for pressurizing the laminated body 110, and the like.

First, the heating and cooling unit 22 (heating unit) heats the laminated body 110 to a temperature at which the fabrication material 111 melts. At this time, the laminated body 110 may be heated while the laminated body 110 is pressurized by a pressure unit. If heating temperature of the heating and cooling unit 22 is T, melting point of the fabrication material 111 is Tm1, and melting point of the release material 112 is Tm2, it is preferable to satisfy a relation of $Tm1 \leq T$. Particularly, it is preferable to satisfy the relation of $Tm1 \leq T \leq Tm2$. Then, the heating and cooling unit 22 (cooling unit) cools the laminated body 110 to a temperature lower than the melting point Tm1 of the fabrication material 111. Thus, the laminated body 110 including the stabilized object 101 is formed.

The post-processing apparatus 13 performs post-processing for removing the object 101 from the laminated body 110 formed by the fabrication apparatus 12. The laminated body 110 includes the object 101 stabilized by the heating and cooling unit 22. The post-processing apparatus 13 is configured to include a peeling unit 23 that performs a process for peeling the release layer 102 from the object 101.

The specific configuration of the peeling unit 23 is not particularly limited. The peeling unit 23 is designed to execute a peeling method compatible with the physical properties (surface free energy, specific gravity, SP (Solubility Parameter) value, MFR (Melt Flow Rate) value, and a linear expansion coefficient, for example) of the object 101 (the fabrication material 111) and the release layer 102 (release material 112).

With the filler acting as a mold, a pressurizing agent, a heat transferring material or the like is filled to the outside of the release layer 102, the filler is peeled from the object 101 together with the release layer 102. Further, when the supporting structure 103 is included in the laminated body 110, the supporting structure 103 is peeled from the object 101 together with the release layer 102.

Peeling of supporting structure 103 from the laminated body 110 formed by the fabrication apparatus 12 is not necessarily done by the post-processing apparatus 13. Alternatively, the peeling may be carried out by a manual peeling operation 35 that peels the release layer 102 and unnecessary portions (supporting structure 103, the filler, etc.) from the object 101. It is suitable to perform the peeling process S3 by the post-processing apparatus 13 for mass production of the object 101. However, a manual peeling operation 35 may be suitable when the number of products to be fabricated is small or when the products are to be custom-made.

Layer Formation by Electrophotographic Process Method

Figure 3:
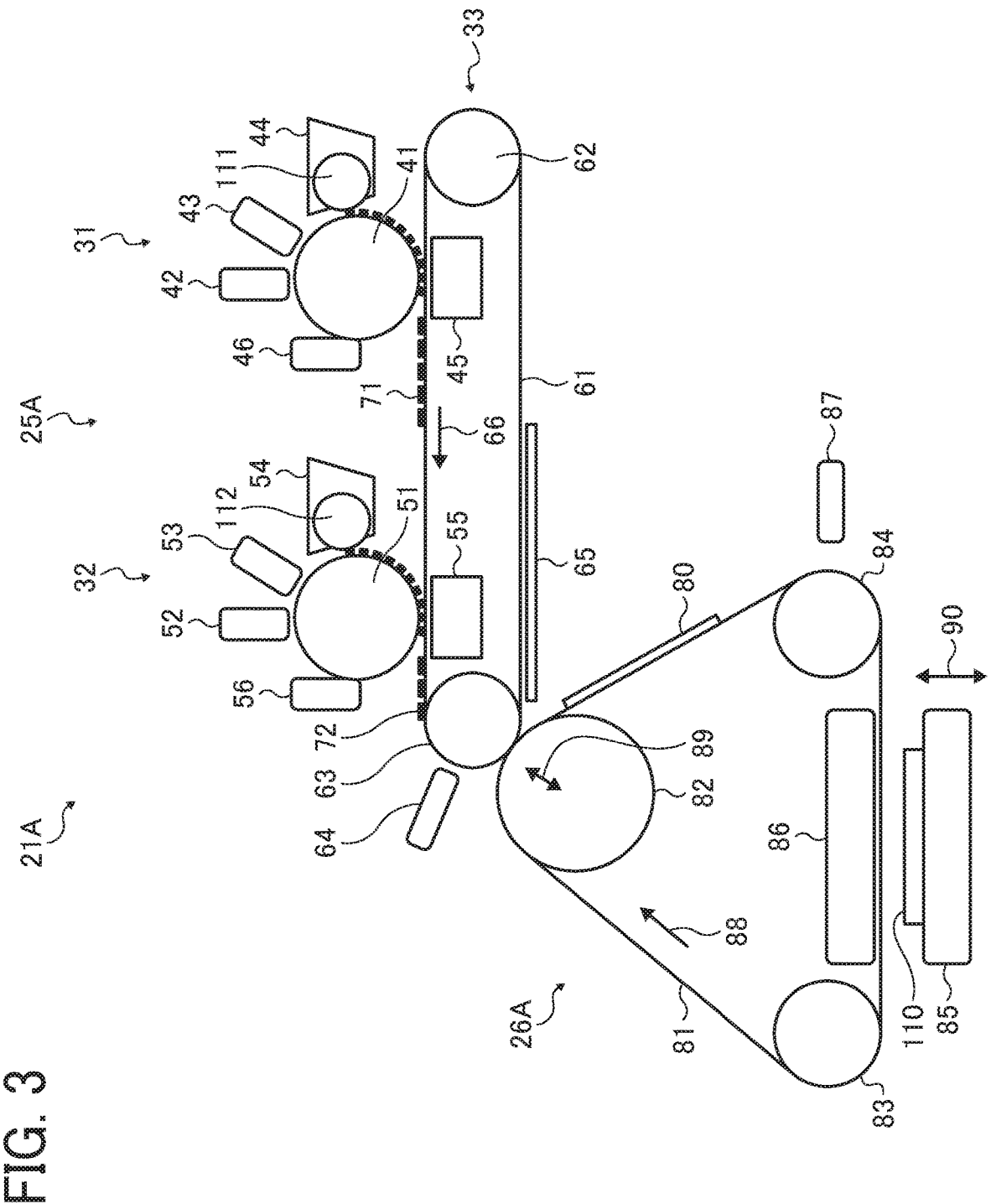
FIG. 3 is a side view of a laminated body forming unit according to a first example: of the first embodiment.

FIG. 3 is a side view of the laminated body forming unit 21A according to a first example of the first embodiment. The laminated body forming unit 21A according to the present embodiment forms the laminated body 110 using the electrophotographic process method. The laminated body forming unit 21A includes a layer forming unit 25A and a lamination unit 26A.

The layer forming unit 25A according to this example includes a first image forming unit 31, a second image forming unit 32, and an intermediate conveyance unit 33.

The first image forming unit 31 forms a two-dimensional fabrication image 71 using the fabrication material 111. The first image forming unit 31 includes a photoconductor 41, a charging device 42, an exposure device 43, a developing device 44, a transfer device 45, and a photoconductor cleaner 46. The photoconductor 41 is a cylindrical member that is rotated by an appropriate driving mechanism. The charging device 42 uniformly charges the entire surface of the photoconductor 41. The exposure device 43 irradiates a surface of the charged photoconductor 41 with laser light so that a latent image corresponding to the cross-sectional shape of the object 101 is formed on the surface of the charged photoconductor 41. The developing device 44 forms the fabrication image 71 by attaching the fabrication material 111 onto the surface of the photoconductor 41 on which the latent image is formed. The transfer device 45 transfers the fabrication image 71 formed on the surface of the photoconductor 41 to the first carrying belt 61 of the intermediate conveyance unit 33.

The second image forming unit 32 forms a two-dimensional releasing image 72 using the release material 112. The second image forming unit 32 includes a photoconductor 51, a charging device 52, an exposure device 53, a developing device 54, a transfer device 55, and a photoconductor cleaner 56. The exposure device 53 of the second image forming unit 32 irradiates a surface of the photoconductor 51 with a laser beam so that a latent image corresponding to the sectional shape of the release layer 102 is formed on the surface of the charged photoconductor 51. The developing device 54 forms the releasing image 72 by attaching the release material 112 onto the surface of the photoconductor 51 on which the latent image is formed. The transfer device 55 transfers the releasing image 72 formed on the surface of the photoconductor 51 onto the first carrying belt 61 of the intermediate conveyance unit 33. Functions of the photoconductor 51, the charging device 52, and the photoconductor cleaner 56 of the second image forming unit 32 are the same as the functions of the photoconductor 41, the charging device 42, and the photoconductor cleaner 46 of the first image forming unit 31, respectively.

The intermediate conveyance unit 33 includes a first carrying belt 61 (carrier), tension rollers 62 and 63, a first detection sensor 64, and a belt cleaner 65. The first carrying belt 61 is an endless belt wound around a plurality of tension rollers 62 and 63. At least one of the plurality of tension rollers 62 and 63 has an appropriate mechanism to apply driving force to the at least one of the plurality of tension rollers 62 and 63. The first carrying belt 61 is rotated in a direction indicated by arrow 66 by the driving force of the tension rollers 62 and 63. The first carrying belt 61 carries the fabrication image 71 formed by the first image forming unit 31 and the releasing image 72 formed by the second image forming unit 32 and conveys the fabrication image 71 and the releasing image 72 to the lamination unit 26A. The first detection sensor 64 detects the fabrication image 71 and the releasing image 72 conveyed by the first carrying belt 61. Readings from the first detection sensor 64 are used for alignment, timing control, abnormality detection, etc., during the process of laminating the layers 80 including the fabrication image 71 and the releasing image 72. The belt cleaner 65 removes the fabrication material 111 and the release material 112 remaining on the first carrying belt 61.

The lamination unit 26A forms the laminated body 110 by sequentially laminating the plurality of layers 80 including the fabrication image 71 and the releasing image 72. The lamination unit 26A according to the present embodiment includes a second carrying belt 81 (carrier), a second transfer roller 82, tension rollers 83 and 84, a stage 85, a lamination heater 86, and a second detection sensor 87.

The second carrying belt 81 is an endless belt wound around the second transfer roller 82 and the tension rollers 83 and 84. At least one of the second transfer roller 82 and the tension rollers 83 and 84 has an appropriate mechanism to apply driving force to the at least one of the second transfer roller 82 and the tension rollers 83 and 84. The second carrying belt 81 is rotated in a direction indicated by the arrow 88 by the driving force of the at least one of the second transfer roller 82 and the tension rollers 83 and 84.

The second transfer roller 82 is displaceable in a direction indicated by arrow 89. When the second transfer roller 82 is displaced in a direction (right upper in FIG. 3) approaching the tension roller 63 of the intermediate conveyance unit 33, the second carrying belt 81 comes into contact with the first carrying belt 61 and the fabrication image 71 and the releasing image 72 on the first carrying belt 61 are transferred to the second carrying belt 81. Conversely, when the second transfer roller 82 is displaced in a direction (lower left in FIG. 3) away from the tension roller 63 of the intermediate conveyance unit 33, the second carrying belt 81 does not contact the first carrying belt 61, and thus the fabrication image 71 and the releasing image 72 on the first carrying belt 61 are not transferred to the second carrying belt 81.

The layers 80 including the fabrication image 71 and the releasing image 72 carried by the second carrying belt 81 is laminated on the stage 85. The stage 85 is displaceable in a direction indicated by arrow 90 in FIG. 3. Upon lamination of the fabrication image 71 and the releasing image 72, the layers 80 heated by the lamination heater 86 are laminated onto the surface of the stage 85 or the surface of the laminated body 110 on the stage 85 as the stage 85 rises. When the lamination process is not executed, the laminated layers 80 are cooled and fixed to the laminated body 110 as the stage 85 descends. The second detection sensor 87 detects the layers 80 on the second carrying belt 81. Readings from the second detection sensor 87 are used for controlling a displacement of the second transfer roller 82, the rotation of the second carrying belt 81, and the displacement of the stage 85, and the like.

A surface layer portion of the first carrying belt 61 and the second carrying belt 81 are preferably composed of an electron-beam irradiated crosslinked fluororesin. Further, good releasability, heat resistance, and durability is required for the surface layer portion of the first carrying belt 61 and the second carrying belt 81 that carry and convey the fabrication image 71, the releasing image 72, and the layers 80 including the fabrication image 71 and the releasing image 72. The electron-beam irradiated crosslinked fluororesin is a substance having particularly high heat resistance and durability among fluororesin having good releasability. Thus, the electron-beam irradiated crosslinked fluororesin is suitable as a material constituting the surface layer portion of the first carrying belt 61 and the second carrying belt 81. Further, a base portion of each of the first carrying belt 61 (first carrier) and the second carrying belt 81 (second carrier) is preferably composed of an invar alloy (FeNi36, 64FeNi). A low deformability is required for the first carrying belt 61 and the second carrying belt 81 in order to prevent an error in a shape of the object 101 even when a number of laminations is large. For example, a lamination process performed 10,000 times to 100,000 times to fabricate an object 101 having a height of from 100 mm to 1000 mm in a direction of lamination is fabricated at a lamination pitch of 0.1 mm. Since the Invar alloy is a substance having a low coefficient of thermal expansion, it is suitable as a material constituting the base portion of the first carrying belt 61 and the second carrying belt 81.

Layer Formation by FDM Method

Figure 4:
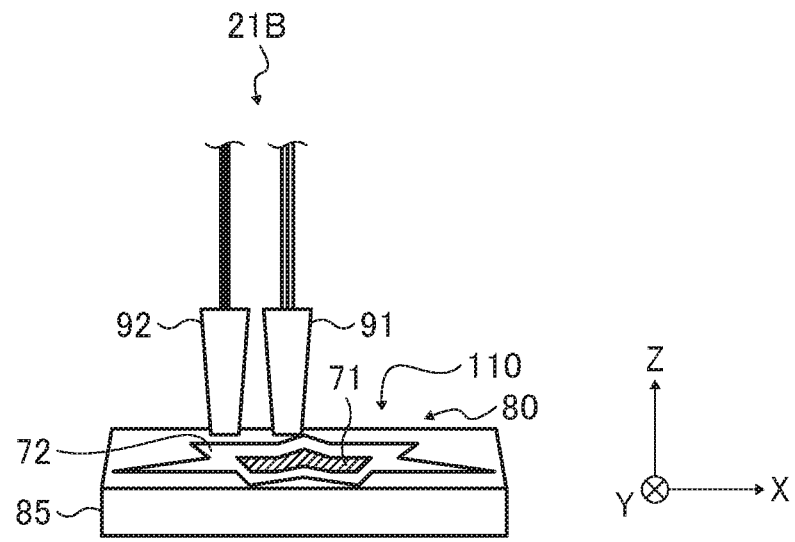
FIG. 4 is a side view of the laminated body forming unit according to a second example of the first embodiment.
Figure 5:
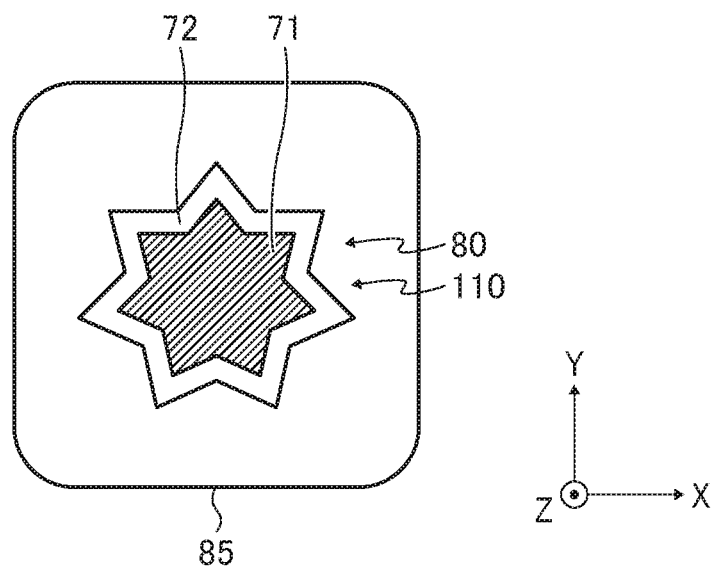
FIG. 5 is a top view of the laminated body formed by the laminated body forming unit according to the second example of the first embodiment.

FIG. 4 is a side view of the laminated body forming unit 21B according to a second example of the first embodiment. FIG. 5 is a top view of the laminated body 110 formed by the laminated body forming unit 21B according to the second example of the first embodiment. The laminated body forming unit 21B according to the present embodiment forms the laminated body 110 using the FDM method.

The layer forming unit according to the present embodiment includes a first fabrication head 91, a second fabrication head 92, and a stage 85. The first fabrication head 91 moves along a X-Y plane, melts the fabrication material 111, and discharges the melted fabrication material 111 onto the stage 85 to form a fabrication image 71 on the stage 85. The second fabrication head 92 moves along the X-Y plane, melts the release material 112, and discharges the melted release material 112 onto the stage 85 to form a releasing image 72 on the stage 85. The stage 85 moves in a Z-axis direction so that the laminated body 110 is formed on a stage 85. The layers 80 including the fabrication image 71 formed by the first fabrication head 91 and the releasing image 72 formed by the second fabrication head 92 are laminated to form the laminated body 110.

Figure 6:
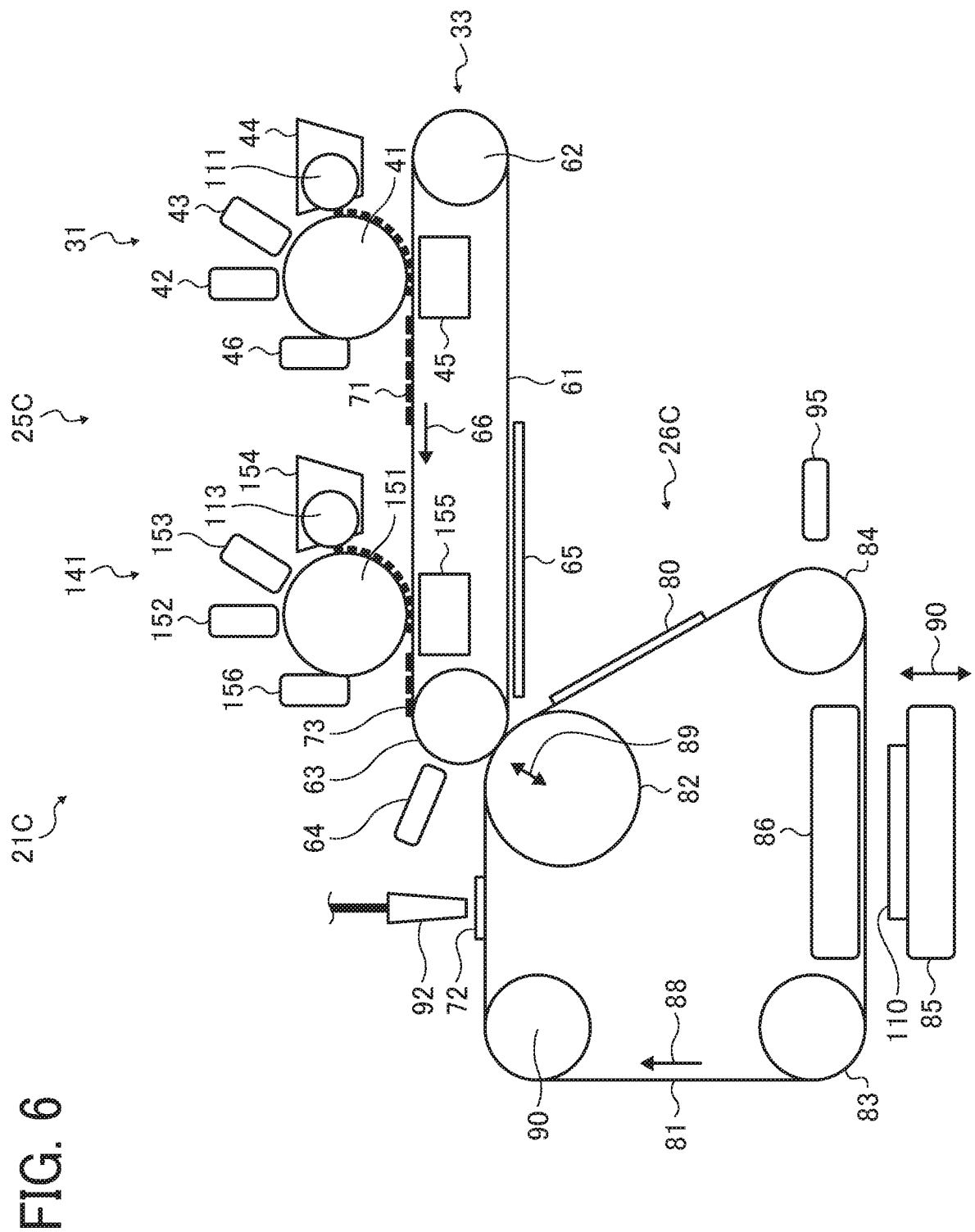
FIG. 6 is a side view of a laminated body forming unit according to a third example of the first embodiment.

Layer Formation by Combination of Electrophotographic Process Method and FDM Method FIG. 6 is a side view of a laminated body forming unit 21C according to a third example of the first embodiment. The laminated body forming unit 21C forms the laminated body 110 using combination of the electrophotographic process method and the FDM method.

The layer forming unit 25C of the laminated body forming unit 21C includes a first image forming unit 31, a second fabrication head 92, and a third image forming unit 141.

Similarly to the first image forming unit 31 in FIG. 3, the first image forming unit 31 in FIG. 6 forms a fabrication image 71 by the electrophotographic process method. Similarly to the second fabrication head 92 of the laminated body forming unit 21B in FIG. 4, the second fabrication head 92 in FIG. 6 forms a releasing image 72 by the FDM method. However, the second fabrication head 92 in FIG. 6 forms a releasing image 72 on the second carrying belt 81, not on the stage 85.

The third image forming unit 141 forms an image with material other than the fabrication material 111 using the electrophotographic process method. Following describes an example in which the third image forming unit 141 forms two-dimensional support image 73 using the support material 113. Similarly to the first image forming unit 31, the third image forming unit 141 includes a photoconductor 151, a charging device 152, an exposure device 153, a developing device 154, a transfer device 155, and a photoconductor cleaner 156. The exposure device 153 of the third image forming unit 141 irradiates a surface of the photoconductor 151 with a laser beam so that a latent image corresponding to the cross-sectional shape of the supporting structure 103 is formed on the surface of the photoconductor 151 charged by the charging device 152. The developing device 154 forms the support image 73 by attaching the support material 113 to the surface of the photoconductor 151 on which the latent image is formed. The transfer device 155 transfers the support image 73 formed on the surface of the photoconductor 151 to the first carrying belt 61 of the intermediate conveyance unit 33. Functions of the photoconductor 151, the charging device 152, and the photoconductor cleaner 156 of the third image forming unit 141 are the same as the functions of the photoconductor 41, the charging device 42, and the photoconductor cleaner 46 of the first image forming unit 31, respectively.

The intermediate conveyance unit 33 of the laminated body forming unit 21C in FIG. 6 is the same as the intermediate conveyance unit 33 in FIG. 3 except that the intermediate conveyance unit 33 in FIG. 6 carries the support image 73 instead of the releasing image 72. In FIG. 6, the first carrying belt 61 carries the fabrication image 71 formed by the first image forming unit 31 and the support image 73 formed by the third image forming unit 141. The first detection sensor 64 detects the fabrication image 71 and the support image 73 conveyed by the first carrying belt 61. The belt cleaner 65 removes the fabrication material 111 and the support material 113 remaining on the first carrying belt 61.

The lamination unit 26C of the laminated body forming unit 21C includes a second carrying belt 81, a second transfer roller 82, tension rollers 83, 84, and 90, a stage 85, a lamination heater 86, and a third detection sensor 95.

When the second transfer roller 82 is displaced in a direction (right upper in FIG. 6) approaching the tension roller 63 of the intermediate conveyance unit 33, the second carrying belt 81 comes into contact with the first carrying belt 61. The fabrication image 71 and the support image 73 on the first carrying belt 61 are transferred to the second carrying belt 81. Further, as described above, the releasing image 72 is formed on the second carrying belt 81 by the second fabrication head 92. Thus, the laminated body forming unit 21C can form the layers 80 including the fabrication image 71, the releasing image 72, and the support image 73 on the second carrying belt 81.

By moving the stage 85 vertically as in the first example illustrated in FIG. 3, the layers 80 are laminated on the stage 85 to form the laminated body 110. The third detection sensor 95 detects the layers 80 on the second carrying belt 81. Readings from the third detection sensor 95 are used for controlling a displacement of the second transfer roller 82, a rotation of the second carrying belt 81, a displacement of the stage 85, and the second fabrication head 92, or the like.

The foregoing description concerns an example in which the third image forming unit 141 forms the support image 73 using the support material 113. However, the third image forming unit 141 may form the fabrication image using a fabrication material 111 different from the fabrication material 111 used by the first image forming unit 31. For example, a color of the fabrication material 111 used by the third image forming unit 141 may be different from a color of the fabrication material 111 used by the first image forming unit 31.

Other Methods for Forming Laminated Body

A further simpler configuration supplies powder of the fabrication material 111 onto the releasing image 72 formed by the FDM method, removes excess powder by a blade, a roller, or the like, melts each predetermined layer by non-contact heater such as a flush to form a temporary laminated body 110. At this time, a difference between a melting point of the fabrication material 111 and a melting point of the release material 112 is required so that the release layer 102 is not deformed by heating. Then, the heating and cooling process is executed.

Methods Other than Lamination Fabrication Method for Forming Release Layer

There is a method for forming release layer 102 not using the lamination fabrication method. This method forms a thermoplastic resin lamination object (object 101) by FDM method or the like, sprays powder onto the resin lamination object or covers the resin lamination object with a film so that a releasing resin (release layer 102) such as PMP (polymethylpentene), fluororesin, or the like is applied to a surface of the resin lamination object. This method executes the heating and cooling process S2 as described below after executing the above-described spraying or covering process. The film made of PMP is used as, for example, a heat-resistant food wrap and the like, and is inexpensive and readily available.

Structure of Layer

Figure 7:
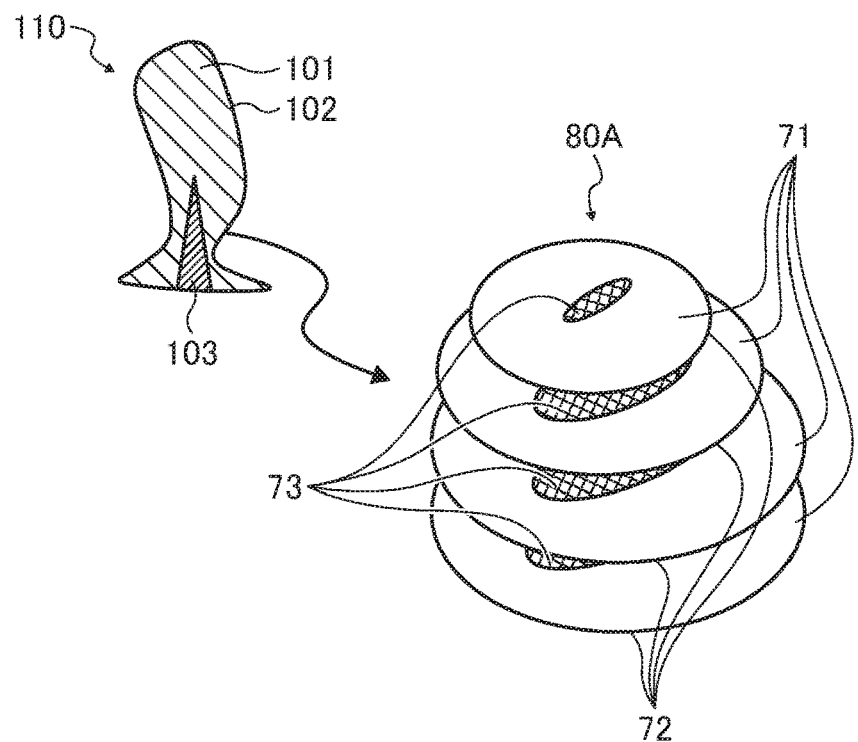
FIG. 7 is a perspective view of an example of a structure of layers according to the first example of the first embodiment.

FIG. 7 is a perspective view of a structural of the layers 80A according to the first example of the first embodiment. The layers 80A according to the first example includes a fabrication image 71, a releasing image 72, and a support image 73. The object 101 is formed by the fabrication image 71 of each layer 80A. The release layer 102 is formed by the releasing image 72 of each layer 80A. The supporting structure 103 is formed by the support image 73 of each layer 80A. The releasing image 72 has a closed linear shape that surrounds the fabrication image 71. Thus, forming the releasing image 72 in each layer 80A can form the laminated body 110 including the object 101 covered with the release layer 102. The supporting structure 103 according to the present example is used for forming a void in the object 101.

Figure 8:
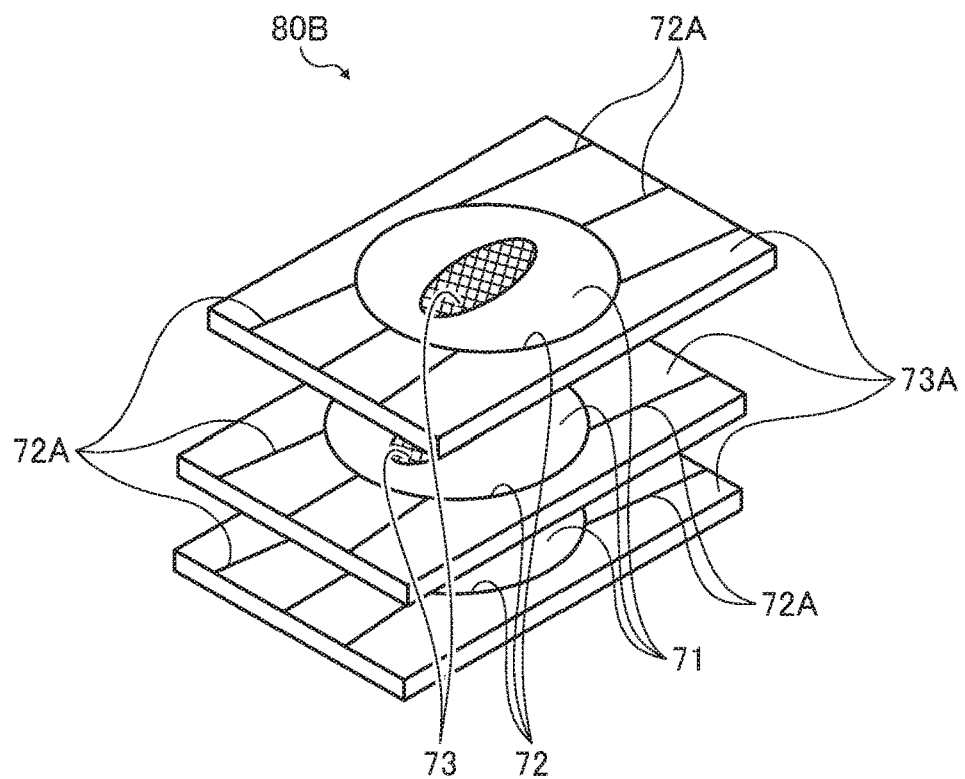
FIG. 8 is a perspective view of a structure of the layers according to the second example of the first embodiment.

FIG. 8 is a perspective view of an example of a structure of the layers 80B according to the second example of the first embodiment. The layers 80B according to the present example includes a fabrication image 71, a releasing image 72, a support image 73, an external support image 73A, and an external releasing image 72A. The external support image 73A is arranged in a rectangular shape to fill an area outside the releasing image 72. The releasing image 72 has a closed linear shape. A plurality of linear-shaped external releasing images 72A is formed in the external support image 73A.

The external releasing image 72A extends from the releasing image 72 having a closed linear shape to an edge portion of the external support image 73A.

Laminating such a layers 80B forms the block-shaped laminated body 110 that includes the object 101, the release layer 102 covering the object 101, an external supporting structure composed of the external support image 73A, and an external release layer composed of the external releasing image 72A. Forming such a block-like laminated body 110 can stabilize the shape of the object 101. Further, forming the external release layer in the external supporting structure can make the external supporting structure to be easily peeled from the external release layer in the peeling process S3.

Structure of Supporting Structure

Figure 9:
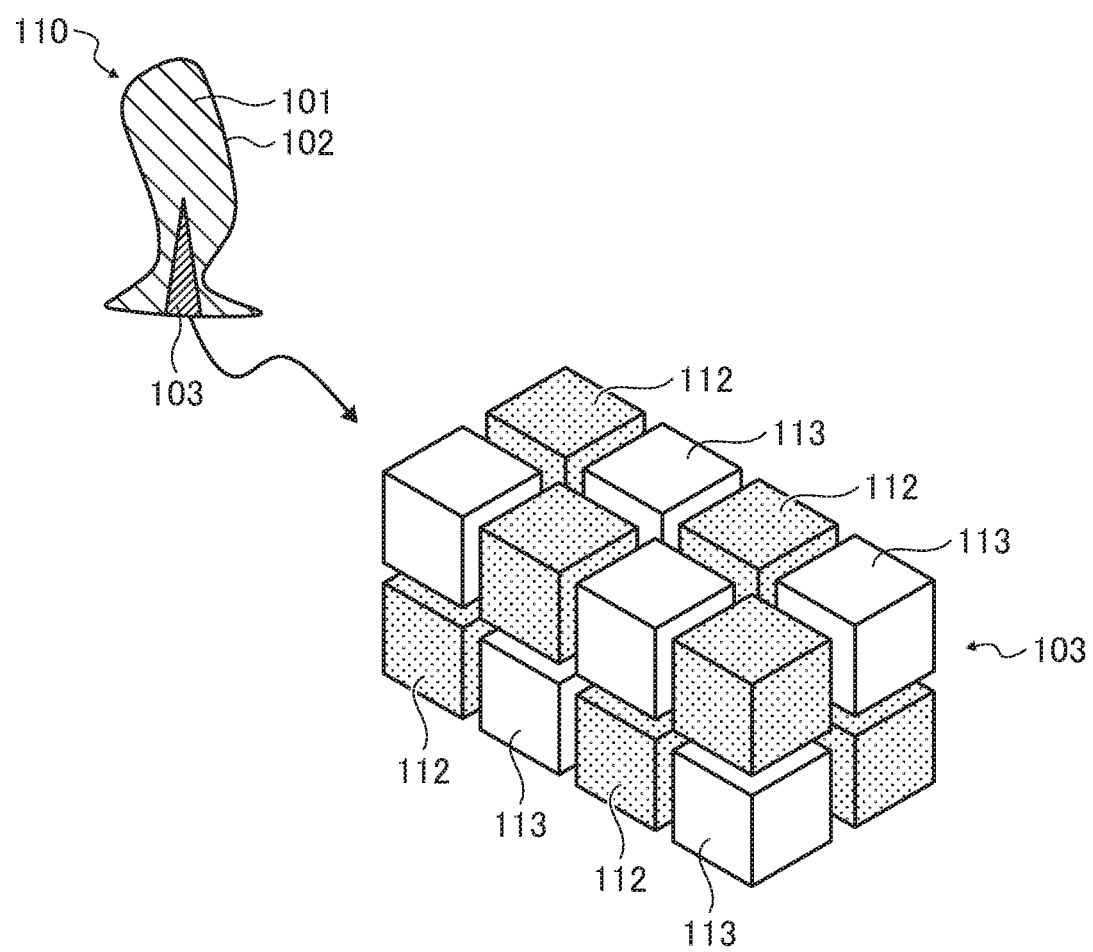
FIG. 9 is a perspective view of an example of a configuration of a supporting structure according to the first example of the first embodiment.

FIG. 9 is a perspective view of the supporting structure 103 according to the first embodiment. The supporting structure 103 according to the first embodiment has a configuration in which a support material 113 and a release material 112 are disposed in a three-dimensional lattice pattern. Such a supporting structure 103 can be formed, for example, by laminating a plurality of layers 80A in which a linear releasing image 72 (release material 112) and a linear support image 73 (support material 113) are arranged in a lattice pattern. Forming such a supporting structure 103 can improve removability of the support material 113.

Heating and Cooling Process

Figure 10:
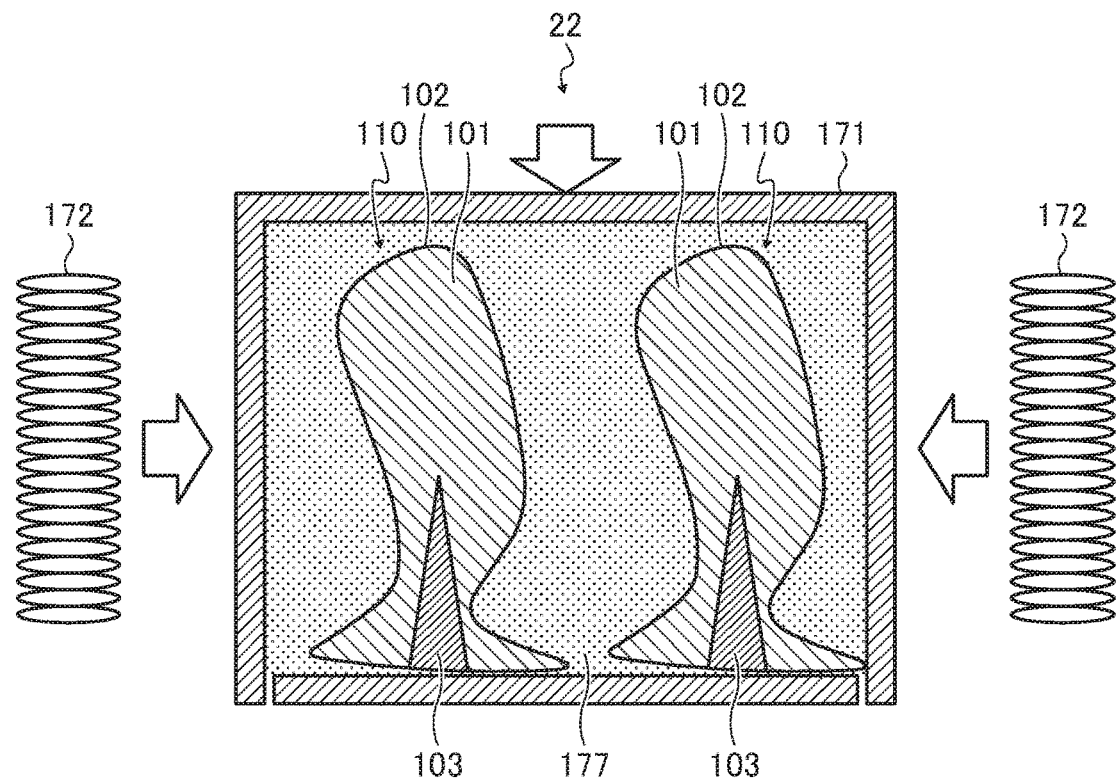
FIG. 10 is a cross-sectional view of an example of execution of a heating process executed by a heating and cooling unit according to the first embodiment.
Figure 11:
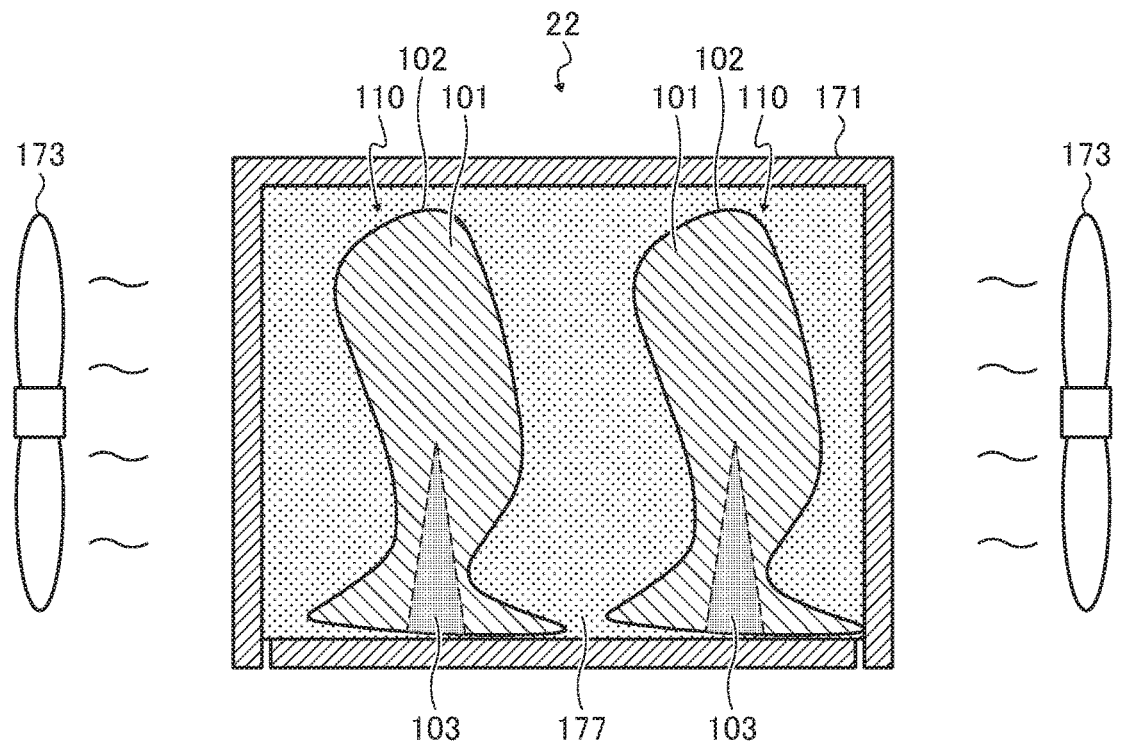
FIG. 11 is a cross-sectional view of an example of execution of a cooling process executed by the heating and cooling unit according to the first embodiment.

FIG. 10 is a cross-sectional view of an example of execution of a heating process executed by the heating and cooling unit 22 according to the first embodiment. FIG. 11 is a cross-sectional view of an example of execution of a cooling process executed by the heating and cooling unit 22 according to the first embodiment. The heating and cooling unit 22 according to this example includes a housing 171, an electric heater 172, and a cooling fan 173.

As illustrated in FIG. 10, the heating process according to this example is performed in a state in which the periphery of the laminated body 110 placed in the housing 171 is filled with a filler 177 to fix the laminated body 110 in the housing 171. The electric heater 172 heats the fabrication material 111 to a temperature at which the fabrication material 111 constituting the object 101 melts. When the heating temperature of the electric heater 172 is T, a melting point of the fabrication material 111 is Tm1, and a melting point of the release material 112 is Tm2, the relation of Tm1≤T is satisfied. Particularly, the electric heater 172 preferably heats the laminated body 110 such that the heating temperature of the electric heater 172 satisfies a relation of Tm1≤T≤Tm2. Even when a relation of Tm2≤Tm1 is satisfied, although the filler 177 may stick to the release layer 102, the above-described heating process can still be executed in some cases.

The filler 177 may be appropriately selected according to use condition of the filler 177. For example, substance used for the filler 177 preferably satisfies at least one of the following conditions (1) through (6):

(1) No dissolution occurs at heating temperature T.

(2) A size that does not affect an accuracy of the object 101 via the release layer 102. The size of the filler 177 is equal to or less than a laminating interval.

(3) Easy to remove without aggregation or sticking after cooling.

(4) Reusable without large deformation or change in thermal characteristics.

(5) High thermal conductivity.

(6) Easy to transport and collect.

For example, in the lamination method using the layers 80B having a structure as illustrated in FIG. 8, the filler 177 may be a mixture of the fabrication material 111 and the release material 112. Further, the filler 177 may be a resin or a foam or the like which is inexpensive and has the same heat resistance as the fabrication material 111. In this case, the above conditions (1) through (3) are satisfied. In the lamination method using the layers 80A having the structure as illustrated in FIG. 7, the filler 177 is supplied in the heating process. In the layers 80A as illustrated in FIG. 7, there is no support image 73 or only slight support image 73 around the fabrication image 71.

Table 1 below illustrates a relation between materials, conditions, thermal conductivity, and other characteristics of candidates for the filler 177.

TABLE 1

| MATERIAL | CONDITION | HEAT CONDUCTIVITY (W/mk) | CHARACTERISTIC |
| --- | --- | --- | --- |
| ALUMINUM PARTICLES | (1), (2), (3), (4) | 32 | SMALL PARTICLES (ABOUT 10 μm) AVAILABLE |
| FERRITE PARTICLES | (1), (2), (3), (4), (6) | 1-5 | MAGNET AVAILABLE FOR CONVEYANCE AND COLLECTION, ETC. |
| SUS ALLOY PARTICLES | (1), (2), (3), (4), (6) | 17 | HIGH HEAT CONDUCTION THAN FERRITE |
| ALUMINUM PIECES | (1), (2), (3), (4), (5) | 236 | HIGH HEAT CONDUCTION BUT MAGNET NOT AVAILABLE |
| COPPER PARTICLES | (1), (2), (3), (4), (5) | 380 | HIGH HEAT CONDUCTION BUT MAGNET NOT AVAILABLE |
| COPPER ALLOY PARTICLES | (1), (2), (3), (4), (5), (6) | 160 | HIGH HEAT CONDUCTION AND MAGNET AVAILABLE |

The materials exemplified in Table 1 may be appropriately combined and used for the filler 177 according to availability, cost, and combination of particle size, and the like. The combination of particle size is described below with reference to FIG. 17. In the example illustrated in Table 1, the copper-iron alloy particles satisfy all the above-described conditions of (1) through (6). Usage of a material with high thermal conductivity increases a temperature uniformity in the heating process. Thus, the heating process can be highly accurately performed within a range of from the melting point to the melting point+2° C. Usage of a crystalline resin having high fluidity can achieve both of an accuracy of shape and lamination strength of the object 101. Further, Usage of material having magnetism, it is possible to recover the filler 177 or the like using a magnet.

After executing the heating process as described above, a cooling process is executed as illustrated in FIG. 11. In the cooling process according to this example, the housing 171 after the heating process is air-cooled by the cooling fan 173 to solidify the object 101. The above heating process and cooling process of melting the object 101 inside the release layer 102 and solidifying the melted object can stabilize the shape of the object 101.

When a powder sintering method is used, a step of arranging the filler 177, which is preheated, around the laminated body 110 is performed in addition to a normal step of arranging the powder layer (layers 80A) for forming the laminated body 110. Thus, a state as illustrated in FIG. 10 can be obtained. In this case, only the cooling process is executed. However, the laminated body 110 inside the housing 171 can be uniformly cooled with high-speed using the filler 177 that is highly thermally conductive as in the condition (5).

Peeling Process

Figure 12:
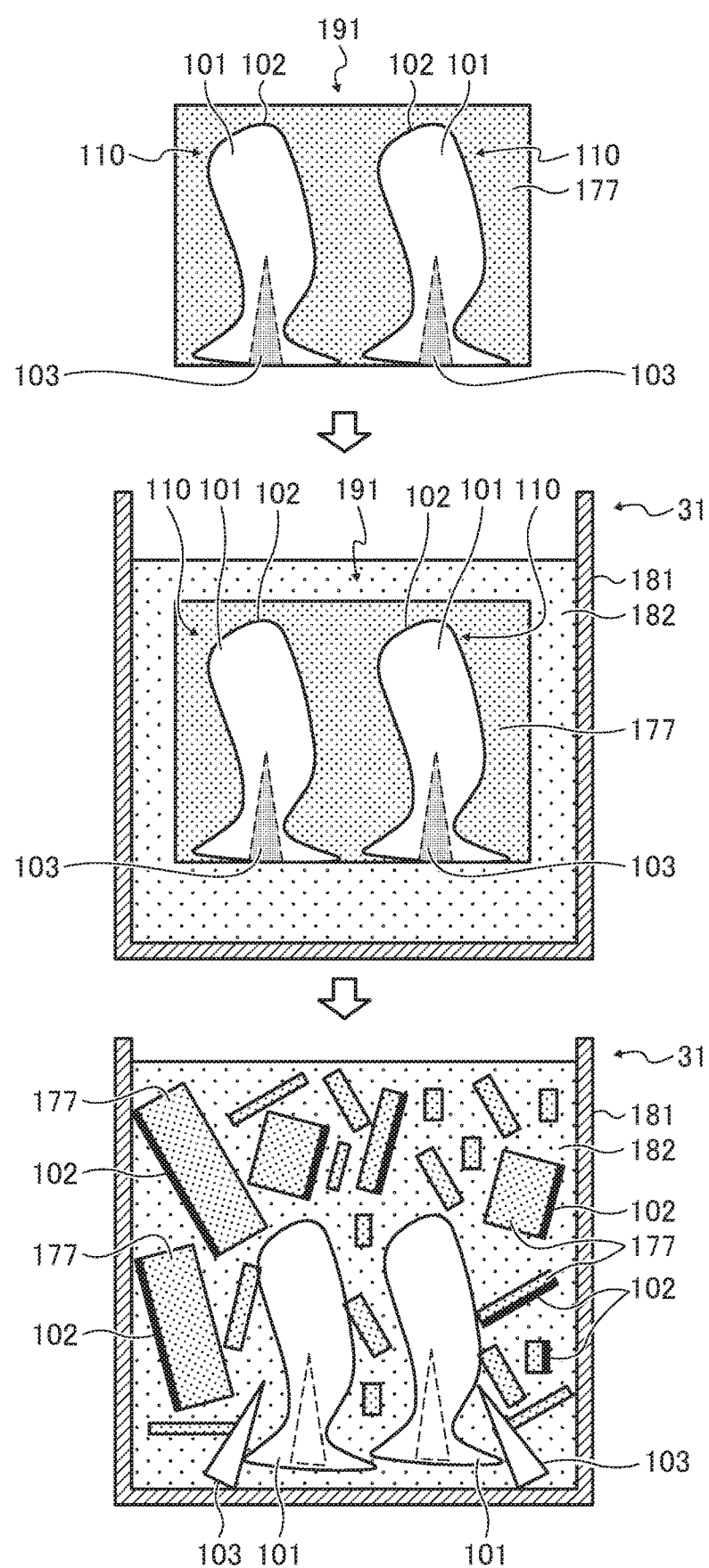
FIG. 12 is a cross-sectional view of an execution example of a peeling process executed by a peeling unit according to the first embodiment.

FIG. 12 is a cross-sectional view of an execution example of the peeling process S3 by the peeling unit 23 according to the first embodiment of the present disclosure. The peeling unit 23 according this example includes a water tank 181. The water tank 181 is filled with water 182.

After the cooling process as illustrated in FIG. 11, a block body 191 is taken out from the housing 171 of the heating and cooling unit 22. In the block body 191, the filler 177 adheres to the laminated body 110 as illustrated in FIG. 12. As illustrated in FIG. 12, the block body 191 taken out from the housing 171 is immersed in the water 182 in the water tank 181. Then, the laminated body 110 (block body 191) is accelerated in the water 182. Thus, the release layer 102 is peeled from the object 101, and at the same time, the filler 177 and the supporting structure 103 are peeled from the object 101 as illustrated in FIG. 12. A method for applying the acceleration to the laminated body 110 is not particularly limited. For example, the laminated body 110 (block body 191) may be vibrated in the water 182. Further, the water 182 may be stirred while the laminated body 110 is in the water 182. Alternatively, acceleration may be applied to the laminated body 110 without using the water 182. In this case, it is necessary to be careful that the separated unnecessary portion does not damage the object 101.

Relation Between Surface Free Energy and Releasability

Figure 13:
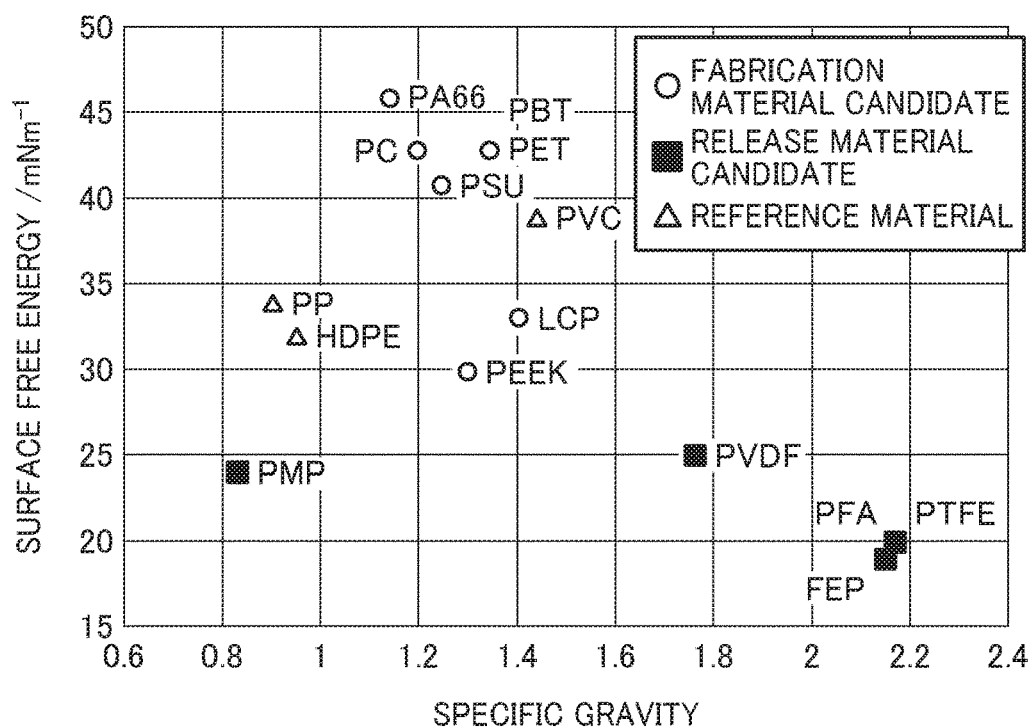
FIG. 13 is a graph illustrating an example of a relation between specific gravities and surface free energies in various materials.

Releasability is often defined by surface free energy. FIG. 13 is a graph illustrating an example of a relation between the specific gravities and the surface free energies in various materials. Specifically, the graph in FIG. 13 illustrates the relation between the specific gravities and the surface free energies of PA66, PC, PSU, PBT, PET, LCP, and PEEK as candidates for the fabrication material 111, PMP, PVDF, PFA, FEP, and PTFE as candidates for the release material 112, and PP (polypropylene), HDPE (high density polyethylene), and PVC (polyvinyl chloride) as reference materials. The specific gravity described here is a value based on water. Fluororesin and PMP are industrially proven substances for peeling applications.

As illustrated in FIG. 13, the surface free energy of the candidates for the release material 112 such as PMP, PVDF, PFA, FEP, and PTFE is sufficiently small (equal to 25 mN/m or smaller). Specifically, the surface free energy of the release material 112 is smaller than the surface free energy of the fabrication material 111. For example, the surface free energy of the release material 112 is equal to 25 mN/m or smaller. As described above, unnecessary portions (release layer 102, supporting structure 103, and filler 177, etc.) can be easily separated from the object 101 using the material having a small surface free energy as the release material 112.

Figure 14:
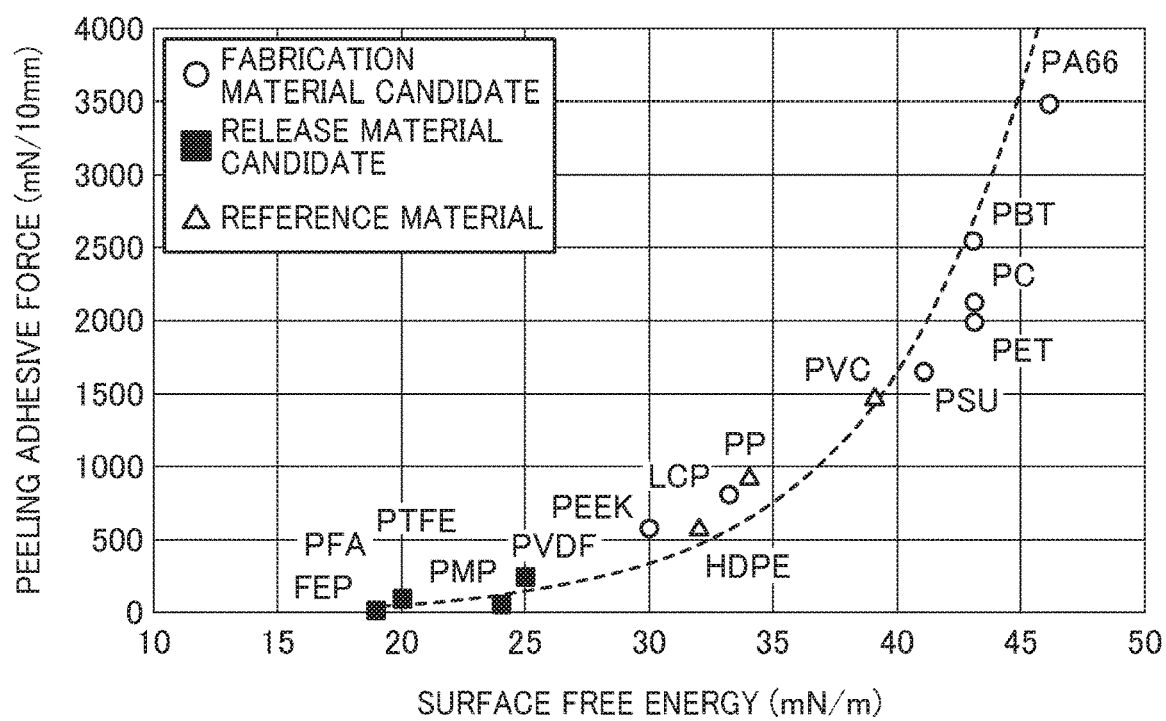
FIG. 14 is a graph illustrating an example of a relation between the surface free energy and a peeling adhesion force in various materials.

FIG. 14 is a graph illustrating an example of a relation between a surface free energy and a peeling adhesion force in various materials. Specifically, the graph in FIG. 14 illustrates the relation between the surface free energies and peeling adhesion force of PA66, PC, PSU, PBT, PET, LCP, and PEEK as candidates for the fabrication material 111, PMP, PVDF, PFA, FEP, and PTFE as candidates for the release material 112, and PP, HDPE, and PVC as reference materials. The peeling adhesion force as described here refers to a force required to peel off acrylic adhesive tape after a predetermined period of time. The acrylic adhesive tape is previously stuck to a surface of a layer composed of the above various materials. As illustrated in FIG. 14, it can be said that the smaller the adhesive strength, the better the releasability (peeling adhesion force) of the material.

As illustrated in FIG. 14, the peeling adhesive force exponentially increases as the surface free energy increases. Thus, the surface free energy of the material of the releasing is preferably 25 mN/m or less to obtain sufficiently small peeling adhesion force as a function of the release layer 102.

Relation Between Specific Gravity and Releasing Property

Not only the surface free energy but also the specific gravity affects the releasability (removability of unnecessary portions). In this example, all of the specific gravities of materials (PA66, PC, PSU, PBT, PET, LCP, and PEEK) of the candidates for the fabrication material 111 is greater than one. Conversely, the specific gravity of PMP, which is one of the release materials 112, is smaller than one. When the laminated body 110 is immersed in the water, a sinking force acts on the object 101 composed by the fabrication material 111 according to this example, and a floating force acts on the release layer 102 composed by PMP as a main component. Thus, as illustrated in FIG. 12, when the peeling process S3 is performed in the water 182, the releasability can be improved by a combination of the fabrication material 111 (for example, PA66, PC, PSU, PBT, PET, LCP, PEEK, etc.) having a specific gravity larger than one and release material 112 (PMP, for example) having a specific gravity smaller than one. Similarly, the fabrication material 111 having a specific gravity smaller than one and the release material 112 having a specific gravity larger than one may be combined. For example, when the material having the specific gravity smaller than one such as PP, HDPE, or the like, is used as the fabrication material 111, good releasability can be obtained using the release material 112 containing PVDF, PFA, FEP, PTFE or the like, which is material having a specific gravity larger than one, as a main component.

When unnecessary portions are to be peeled off by applying acceleration such as vibration, rotation, etc. to the object 101, the releasability is improved by a generation of difference of an inertial force. The inertial force increases with an increase of the specific gravity of the fabrication material 111 and the specific gravity of the release material 112. Thus, good releasability can be obtained by combining the release material 112 and the fabrication material 111 having a large difference in specific gravity with the release material 112. For example, when PA66, PC, PSU, PBT, PET, LCP, and PEEK are used as the fabrication material 111, the good releasability can be obtained by using FEP, PFA, or PTFE, which is material having a relatively large specific gravity, as the release material 112. The difference between the specific gravity of the fabrication material 111 and the specific gravity of the release material 112 is preferably 0.3 or more.

Relation Between SP Value and Releasability

Figure 15:
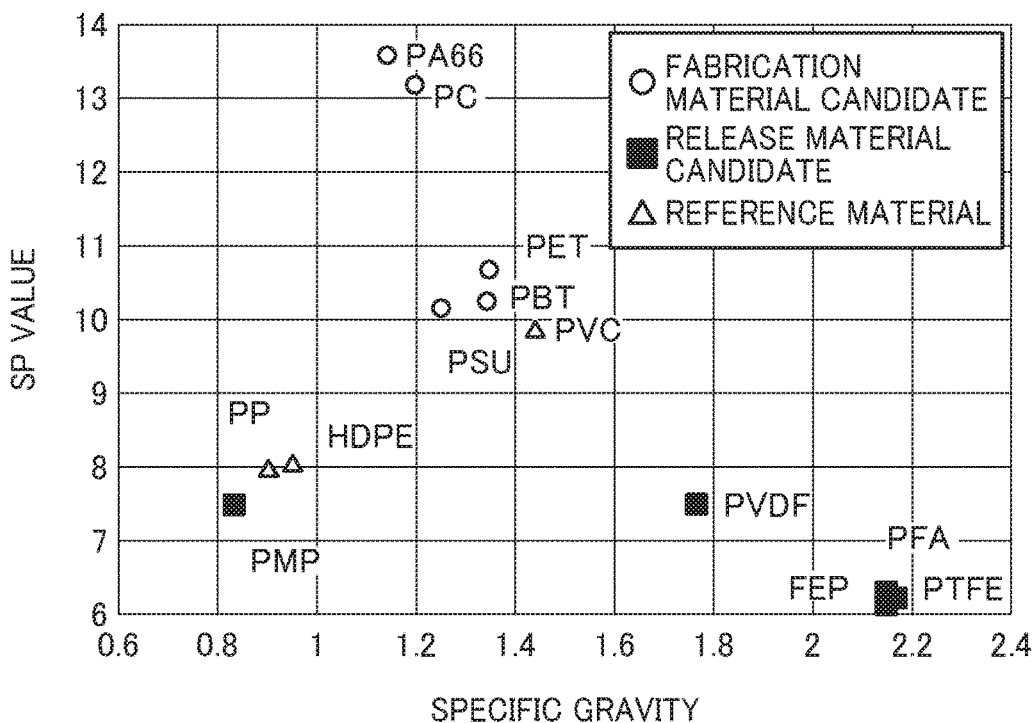
FIG. 15 is a graph illustrating an example of a relation between the specific gravity and SP (Solubility Parameter) value in various materials.

FIG. 15 is a graph illustrates an example of the relation between the specific gravity and SP (Solubility Parameter) value in various materials. The graph in FIG. 15 illustrates a relation between the specific gravity and the SP value of PA66, PC, PSU, PBT, and PET as candidates for the fabrication material 111, PMP, PVDF, PFA, FEP, and PTFE as candidates for the release material 112, and PP, HDPE, and PVC as the reference material.

As illustrated in FIG. 15, the SP values of the candidates for the release material 112 (PMP, PVDF, PFA, FEP, and PTFE) are smaller than the SP values of the candidates for the fabrication material 111 (PA66, PC, PSU, PBT, and PET). The greater the difference in the SP values between the fabrication material 111 and the release material 112, the better the releasability. Thus, good releasability can be obtained by combining the fabrication material 111 and the release material 112, the difference of the SP values of which is large. For example, excellent releasability can be obtained by using PA66 or PC as the fabrication material 111 and using PMP, PVDF, FEP, PFA, or PTFE as the release material 112. The difference between the SP value of the fabrication material 111 and the SP value of the release material 112 is preferably two or more.

Relation Between Line Expansion Rate and Releasability

Figure 16:
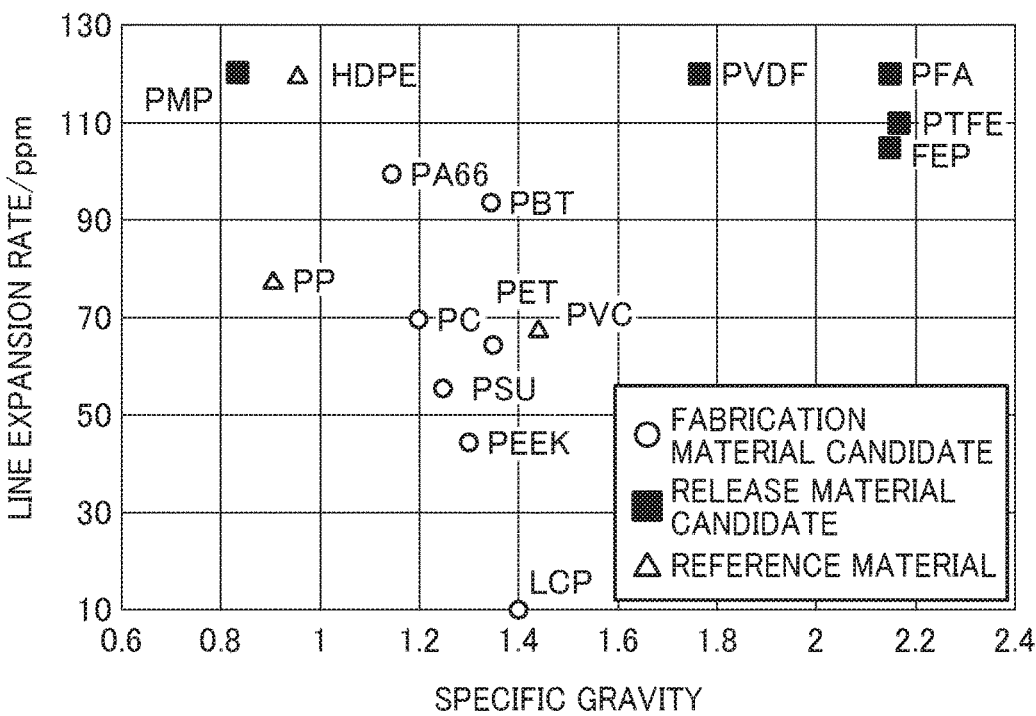
FIG. 16 is a graph illustrating an example of a relation between the specific gravity and line expansion rate in various materials.

FIG. 16 is a graph illustrates an example of the relation between the specific gravity and line expansion rate in various materials. The graph in FIG. 16 illustrates a relation between the specific gravity and the line expansion rate of PA66, PC, PSU, PBT, PET, PEEK, LCP as candidates for the fabrication material 111, PMP, PVDF, PFA, FEP, and PTFE as candidates for the release material 112, and PP, HDPE, and PVC as the reference materials.

As shown in FIG. 16, the coefficients of linear expansion of the candidate materials (PMP, PVDF, PFA, FEP, and PTFE) of the release material 112 are the same as those of the candidates for the fabrication material 111 (PA 66, PC, PSU, PBT, And PET). The larger the difference in the line expansion rate between the fabrication material 111 and the release material 112, the better the releasability. An increase of the difference in the line expansion rate increases a difference in shrinkage between the object 101 and the release layer 102 during the cooling process after the heating process. Thus, good releasability can be obtained by combining the fabrication material 111 and the release material 112, the difference of the line expansion rate of which is large. For example, excellent releasability can be obtained by using PMP, PVDF, FEP, PFA, or PTFE as the release material 112 and using LCP as the fabrication material 111. The difference between the lines expansion rate of the fabrication material 111 and the release material 112 is preferably 10 ppm or more.

Figure 17:
FIG. 17 is a table illustrating an example of the relation between the specific gravity and a melting point of the candidates for material of the fabrication material and the specific gravity and the melting point of the candidates for the material of the release material.

Relation Between Melting Point of Fabrication Material and Melting Point of Release Material FIG. 17 is a table illustrating an example of the relation between the specific gravity and the melting point Tm1 or Tm2 of the candidates for material of the fabrication material 111 and the specific gravity and the melting point Tm2 of the candidates for the material of the release material 112. In this example, PC, PA12, POM, PSF, PEI, PA6, PBT, PA66, and PPS are listed as candidates for the fabrication material 111, and modified PTFE, PFA, FEP, PCTFE, and PMP are listed as candidates for the release material 112. The modified PTFE has a melting point not largely different from the melting point of PTFE of 315° C.

In this example, Dyneon thermoplastic fluororesin THV (Tetrafluoroethylene, Hexafluoropropylene, and Vinylidene fluoride) manufactured by 3M Co. and having a melting point equal to or lower than 225° C. is used as the modified PTFE.

Figure 19:
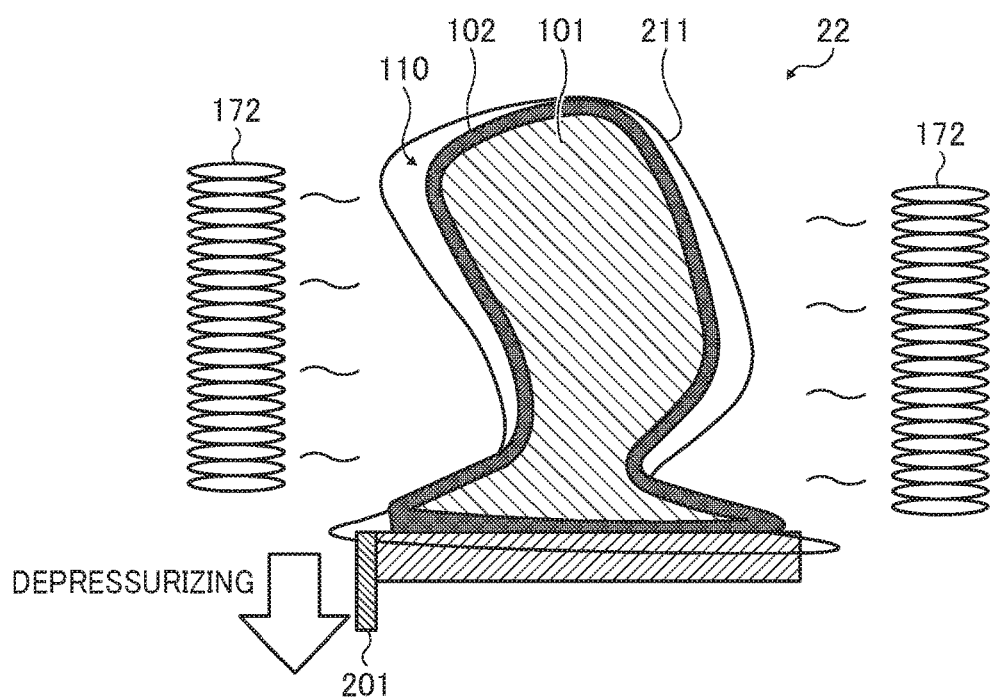
FIG. 19 is a cross-sectional view of an example of execution of the heating and cooling process executed by the heating and cooling unit according to the first embodiment.

In FIG. 17, the melting point Tm1 of each candidate of the fabrication material 111 and the melting point Tm2 of each candidate of the release material 112 are illustrated. When the filler 177 is deformed in the heating process or when the filler 177 is not used (for example, in a case as illustrated in FIG. 19 or FIG. 21 as described below), the combination of the fabrication material 111 and the release material 112 is selected to satisfy relation of Tm2>Tm1. Preferably, the combination of the fabrication material 111 and the release material 112 is selected to satisfy relation of Tm2>Tm1+10° C. In the heating process in the heating and cooling process S2, the object 101 is melted once. However, the release layer 102 has to maintain the shape without melting in the heating process.

Particle Diameter of Filler

Following considers a particle diameter of the filler 177 filled in the housing 171 in the heating and cooling unit 22 as illustrated in FIG. 10.

Figure 18:
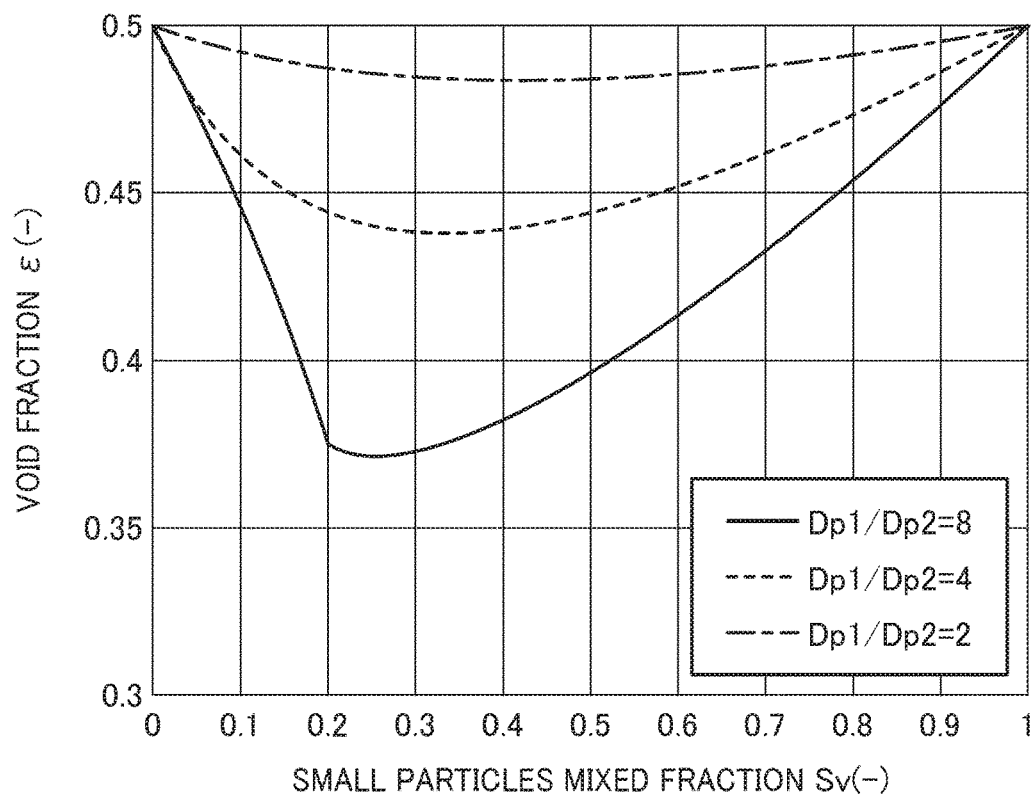
FIG. 18 is a graph illustrating an example of a relation between a particle diameter ratio, a small particle mixed fraction, and a spatial ratio in a large and small two-component mixed filling layer.

FIG. 18 is a graph illustrating an example of the relation between a particle diameter ratio Dp1/Dp2, a small particle mixed fraction Sv, and a spatial ratio ε in a large and small two-component mixed filling layer. The large and small two-component mixed filling layer is a layer in which a mixture containing large particles and small particles is filled in a predetermined filling region (for example, a space in the housing 171). The small particles have a particle diameter smaller than a particle diameter of the large particles. Dp1 represents a particle diameter of large particles and Dp2 represents a particle diameter of small particles. In this example, three particle diameter ratios Dp1/Dp2=8, Dp1/Dp2=4, and Dp1/Dp2=2 are illustrated. The small particle mixed fraction Sv is a ratio of an amount of the small particles to the amount of the mixture. The space ratio ε is a ratio of a volume of a space in which neither large particles nor small particles exist to a volume of the filled region in which the mixture is filled. FIG. 18 illustrates that the spatial ratio becomes the smallest when the particle diameter ratio is Dp1/Dp2=8 and the small particle mixed fraction Sv is 0.28.

The space ratio ε of the filler 177 is preferably as small as possible when the filler 177 is filled around the laminated body 110 in the housing 171 as similarly to the heating and cooling unit 22 in FIG. 10. The smaller the space ratio ε of the filler 177 is, the higher a compression efficiency and a heat transfer efficiency becomes. Thus, the particle diameter ratio is preferably Dp1/Dp2=8, the small particle mixed fraction Sv is preferably from 0.2 to 0.3 and is more preferably 0.28 when the filler 177 is composed of the mixture including the large and small two-component particles.

As described above, according to the present embodiment, the release layer 102 is formed to cover the object 101 that is a target to be fabricated. Thus, unnecessary portions such as the supporting structure 103, the filler 177, and the like, can be removed together with releasing of the release layer 102. Thus, removability of the unnecessary portions other than the object 101 can be improved. Further, the release layer 102 is formed to cover the object 101. Thus, the present embodiment can sufficiently heat the object 101 (fabrication material 111) without causing a disintegration of a shape of the object 101. Thus, the present embodiment can sufficiently strengthen a bonding of a lamination interface of each of the layers 80A of the object 101. Thus, the present embodiment can improve the strength of the object 101 in the laminating direction.

Like reference numerals are given to constituent elements having the same or similar functions and advantages as those of the first embodiment. Redundant descriptions thereof may be omitted unless otherwise required.

Second Embodiment

FIG. 19 is a cross-sectional view of an example of execution of the heating and cooling process S2 by the heating and cooling unit 22 according to the first embodiment. The heating and cooling process S2 according to the present embodiment includes a step of covering a periphery of the laminated body 110 with the heat-resistant film 211 and a step of depressurizing a space between the laminated body 110 (release layer 102) and the heat-resistant film 211. The laminated body 110 is formed by the laminated body forming process S1 using the laminated body forming unit 21 as described above. Thus, the heating and cooling unit 22 can heat and cool the object 101 while pressurizing the object 101 by press-contacting the heat-resistant film 211 to the laminated body 110 (release layer 102).

Examples of the material constituting the heat-resistant film 211 include polyimide, PET, PVDF, and PFA.

A method of depressurizing the space between the laminated body 110 and the heat-resistant film 211 is not particularly limited. For example, there is a method of communicating an inside of the heat-resistant film 211 and a pipe 201 connected to an appropriate suction device and discharging air inside the heat-resistant film 211 via the pipe 201 using the suction device. Thus, the laminated body 110 is heated until the object 101 (fabrication material 111) is melted by the above-described method and then cooled by cooling fans 173 or the like.

FIG. 20 is across sectional view of an execution example of the peeling process S3 by the peeling unit 23 according to the second embodiment. The peeling process S3 according to the present embodiment is performed inside the water tank 181 filled with water 182 as similarly to the peeling process S3 according to the first embodiment in FIG. 12.

The laminated body 110 subjected to the heating and cooling process S2 using the heat-resistant film 211 as described above is immersed in the water 182 in the water tank 181. In the example illustrated in FIG. 20, the heat-resistant film 211 has already been removed from the laminated body 110 at this point. However, the laminated body 110 may be immersed in the water 182 while still covered with the heat-resistant film 211. Then, similarly to the first embodiment illustrated in FIG. 12, acceleration is applied to the laminated body 110 in the water 182. Thus, the release layer 102 is peeled from the object 101. At this time, if the heat-resistant film 211 remains on the laminated body 110, the heat-resistant film 211 is also peeled from the object 101 together with the release layer 102.

According to the present embodiment, the laminated body 110 is pressurized using the heat-resistant film 211 instead of the filler 177. Thus, it is possible to simplify a configuration of the heating and cooling unit 22 and the peeling unit 23 as compared with a configuration using the filler 177. Thus, a cost for manufacturing the heating and cooling unit 22 and the peeling unit 23 can be reduced.

Third Embodiment

FIG. 21 is a cross-sectional view of an example of execution of the heating and cooling process S2 by the heating and cooling unit 22 according to a third embodiment. The heating and cooling process S3 according to the present embodiment includes a step of depressurizing a space between object 101 of the laminated body 110 and the release layer 102. The laminated body 110 is formed by the laminated body forming process S1 using the laminated body forming unit 21 as described above. Thus, the heating and cooling unit 22 can heat and cool the object 101 while pressurizing the laminated body 110 by press-contacting the release layer 102 to the object 101. The release layer 102 of the laminated body 110 subjected to such a heating and cooling process S2 can be peeled from the laminated body 110 in the peeling process S3 according to the second embodiment illustrated in FIG. 20.

The present embodiment can heat and cool the object 101 while pressurizing the object 101 by depressurizing the space between the object 101 and the release layer 102 without using an object for pressurizing the object 101 such as the filler 177, the heat-resistant film 211, and the like. Thus, it is possible to simplify a configuration of the heating and cooling unit 22 and the peeling unit 23. Thus, a cost for manufacturing the heating and cooling unit 22 and the peeling unit 23 can be reduced.

In any of the above-described embodiments, there is no need to use water-soluble particles having a special structure as the support material 113. There is no limitation in a combination of the fabrication material 111 and the support material 113. Thus, it is possible to select the fabrication material 111 in a wide range. Further, the present embodiment can improve removability of unnecessary portions such as a mold member and the supporting structure 103. Further, the strength (tensile strength, bending strength, etc.) in a lamination direction of the object 101 can be increased to about 82% or more of the strength in a plane direction.

According to the present disclosure, it is possible to improve removability of unnecessary portions other than an object and strength of the object in a lamination direction.

It is to be noted that the above embodiments are presented as examples, and it is not intended to limit the scope of the present disclosure.

Numerous additional modifications to the above-described embodiment and variations are possible. It is therefore to be understood that, within the scope of the appended claims, the disclosure of this patent specification may be practiced otherwise than as specifically described herein. The above described embodiments are included in the scope of the present disclosure and are included in the present disclosure described in the claims and equivalents.

What is claimed is:

1. A fabrication method comprising:
    laminating a fabrication material to form an object; and
    applying a release material to a surface of the object to form a release layer on the surface of the object, a surface free energy of the release material being equal to or smaller than 25 mN/m, wherein a solubility parameter (SP) value of the release material is relatively smaller than an SP value of the fabrication material.

2. The fabrication method according to claim 1, further comprising:
    heating the object on which the release layer is applied to a temperature at which the fabrication material melts;
    cooling the object on which the release layer is attached to solidify the fabrication material after the heating; and
    peeling the release layer off the object.

3. The fabrication method according to claim 2, wherein the heating:
    places the object on which the release layer is applied in a tank;
    fills a filler around the object; and
    heats the object around which the filler fills in the tank.

4. The fabrication method according to claim 3, wherein the filler includes a copper-iron alloy.

5. The fabrication method according to claim 2, wherein the heating:
    covers the object on which the release layer is applied with a film; and
    heats the object covered with the film while depressurizing a space inside the film.

6. The fabrication method according to claim 2, wherein the heating heats the object on which the release layer is applied while depressurizing a space between the object and the release layer.

7. The fabrication method according to claim 1, wherein a line expansion rate of the release material is relatively larger than a line expansion rate of the fabrication material.

8. The fabrication method according to claim 1, wherein:
    a specific gravity of the fabrication material is larger than one; and
    a specific gravity of the release material is smaller than one.

9. The fabrication method according to claim 1, wherein:
    a specific gravity of the fabrication material is smaller than one; and
    a specific gravity of the release material is larger than one.

10. The fabrication method according to claim 1, wherein a difference of a specific gravity of the fabrication material and a specific gravity of the release material is equal to or larger than 0.3.

11. The fabrication method according to claim 1, wherein the release material includes polymethylpentene (PMP) as a main component.

12. The fabrication method according to claim 1, wherein the release material contains at least one of substance selected from a group consisting of tetrafluoroethylene-hexafluoropropylene copolymer (FEP), tetrafluoroethylene-perfluoroalkylvinylether copolymer (PFA), modified polytetrafluoroethylene (PTFE), and polyvinylidene fluoride (PVDF).

13. The fabrication method according to claim 1, wherein a melting point of the release material is relatively higher than a melting point of the fabrication material.

14. The fabrication method according to claim 1, wherein the object includes a supporting structure to form a void in the object, and the supporting structure includes a support material and the release material.

15. A fabrication apparatus for manufacturing an object, the fabrication apparatus comprising:
    a first image forming unit device to laminate a layer of a fabrication material, the first image forming device including a first carrier, a surface of the first carrier being composed of an electron-beam irradiated crosslinked fluororesin; and
a second image forming device to form a layer of a release material including a surface free energy equal to or smaller than 25 mN/m, on a surface of the layer of the fabrication material.

16. The fabrication apparatus according to claim 15, wherein:
the first image forming device includes:
a first photoconductor;
a first charging device to charge the first photoconductor;
a first exposure device to irradiate the first photoconductor with light to form a first latent image on the first photoconductor;
a first developing device to apply the fabrication material to the first latent image to form a first, image; and
a first transfer device to transfer the first image onto a first carrier; and
the second image forming device includes:
a second photoconductor;
a second charging device to charge the second photoconductor;
a second exposure device to irradiate the second photoconductor with light to form a second latent image on the second photoconductor;
a second developing device to apply the release material to the second latent image to form a second image; and
a second transfer device to transfer the second image onto a second carrier.

17. The fabrication apparatus according to claim 16, wherein a base of the first carrier is composed of an alloy.

18. A fabrication system for manufacturing an object, the fabrication system comprising:
a fabrication apparatus including
a first image forming device to laminate a layer of a fabrication material, and
a second image forming device to form a layer of a release material, including a surface free energy equal to or smaller than 25 mN/m, on a surface of the layer of the fabrication material;
a heating and cooling device to heat the fabrication material on which the release layer is formed at a temperature at which the fabrication material melts and cool the object on which the release layer is attached to solidify the fabrication material; and
a peeling device to peel the release layer of the object.

19. The fabrication system according to claim 18, wherein:
the first image forming device of the fabrication apparatus includes:
a first photoconductor;
a first charging device to charge the first photoconductor;
a first exposure device to irradiate the first photoconductor with light to form a first latent image on the first photoconductor;
a first developing device to apply the fabrication material to the first latent image to form a first image; and
a first transfer device to transfer the first image onto a first carrier; and
the second image forming device of the fabrication apparatus includes:
a second photoconductor;
a second charging device to charge the second photoconductor;
a second exposure device to irradiate the second photoconductor with light to form a second latent image on the second photoconductor;
a second developing device to apply the release material to the second latent image to form a second image; and
a second transfer device to transfer the second image onto a second carrier.

20. The fabrication system according to claim 19, wherein:
a first carrier, a surface of the first carrier being composed of an electron-beam irradiated crosslinked fluororesin.

* * * * *